United States Patent
Chung Davidson et al.

(10) Patent No.: US 10,013,723 B2
(45) Date of Patent: ***Jul. 3, 2018

(54) METHODS AND APPARATUS FOR INTERACTIVE MEMORY BOOK

(71) Applicant: Yearbooker LLC, New York, NY (US)

(72) Inventors: Fanny Chung Davidson, New York, NY (US); Robert Davidson, New York, NY (US)

(*) Notice: Subject to any disclaimer, the term of this patent is extended or adjusted under 35 U.S.C. 154(b) by 684 days.

This patent is subject to a terminal disclaimer.

(21) Appl. No.: 14/679,865

(22) Filed: Apr. 6, 2015

(65) Prior Publication Data

US 2015/0212672 A1  Jul. 30, 2015

Related U.S. Application Data

(63) Continuation-in-part of application No. 14/535,270, filed on Nov. 6, 2014, now Pat. No. 9,030,496.

(60) Provisional application No. 62/012,386, filed on Jun. 15, 2014, provisional application No. 61/971,493, filed on Mar. 27, 2014, provisional application No. 61/901,042, filed on Nov. 7, 2013.

(51) Int. Cl.
*G09G 5/00* (2006.01)
*G06Q 50/00* (2012.01)

(52) U.S. Cl.
CPC ..... *G06Q 50/01* (2013.01); *H04Q 2213/13109* (2013.01); *H04Q 2213/13175* (2013.01)

(58) Field of Classification Search
None
See application file for complete search history.

(56) References Cited

U.S. PATENT DOCUMENTS

| | | | | |
|---|---|---|---|---|
| 6,738,154 | B1 * | 5/2004 | Venable | G06K 9/32 358/1.15 |
| 9,030,496 | B1 * | 5/2015 | Chung Davidson | G06Q 50/01 345/636 |
| 2010/0070572 | A1 * | 3/2010 | Olson | G06Q 10/10 709/203 |
| 2014/0080456 | A1 * | 3/2014 | Nunn, Jr. | H04W 4/00 455/414.1 |

* cited by examiner

*Primary Examiner* — Xiao Wu
*Assistant Examiner* — Mohammad H Akhavannik
(74) *Attorney, Agent, or Firm* — Joseph P. Kincart; Rogers Towers, P.A.

(57) ABSTRACT

The present disclosure provides for image processing apparatus for generating static image data and corresponding Spatial Coordinates as an infrastructure for receiving media input. The media input will generally be related to the image data corresponding with selected Spatial Coordinates. Image data may specifically relate to a physical memory book converted to static image data.

19 Claims, 18 Drawing Sheets

FIG. 4B

METHODS AND APPARATUS FOR INTERACTIVE MEMORY BOOK

CROSS REFERENCE TO RELATED APPLICATIONS

The present application claims priority to pending application Ser. No. 14/535,270 entitled METHODS FOR AND APPARATUS FOR INTERACTIVE SCHOOL YEARBOOK and filed Nov. 6, 2014 as a Continuation in Part application, which in turn claims priority to provisional patent application Ser. No. 61/901,042, filed Nov. 7, 2013, entitled, "METHODS FOR AND APPARATUS FOR INTERACTIVE SCHOOL YEARBOOK"; and also in turn claims priority to provisional patent application Ser. No. 61/971,493, filed Mar. 27, 2014, entitled, "METHODS FOR AND APPARATUS FOR INTERACTIVE SCHOOL YEARBOOK"; and also in turn claims priority to pending provisional patent application Ser. No. 62/012,386, filed Jun. 15, 2014, entitled, "METHODS FOR AND APPARATUS FOR INTERACTIVE SCHOOL YEARBOOK". The subject matter of each of the foregoing documents is incorporated herein by reference.

FIELD OF THE DISCLOSURE

The present disclosure relates to image processing apparatus for generating static image data and corresponding Spatial Coordinates as an infrastructure for receiving media input from a user and directed to the owner of a volume of the image data.

BACKGROUND OF THE DISCLOSURE

Memory books have taken on many forms as people seek to memorialize various events and timeframes of their lives. Organization yearbooks, camp memory books, military books and other volumes typically include photos and text describing people and events associated with a traditional class. Organization yearbooks generally carry images of students and teachers in a organization and are distributed as mementos towards the end of each organization year.

Typically, yearbooks are signed during the last days of organization with brief personal provide a yearbook entries by students or faculty to other students. Each signer may select a place to "sign" with their yearbook Entries with a pen or marker in a students' yearbook. Students have the ability to allow or not allow fellow students to sign their yearbook book, since the physical book is in their possession and they need not hand it over to all students for signing. Once graduation is complete content is rarely added to yearbooks. The yearbook takes on a time capsule quality. Other types of memory books include family albums, anniversary albums company albums or other volumes.

With the advent of personal computers, mobile phones and tablets, digital social media has provided an alternative to memory books. However, social media is generally open to a large group of people with essentially no time limitation. Social media also includes many subjects that go beyond a organization experience. What is needed therefore is a digital medium to capture and enhance a discrete experience.

SUMMARY OF THE DISCLOSURE

Accordingly, the present disclosure provides for image processing apparatus for generating static image data and corresponding Spatial Coordinates as an infrastructure for receiving media input, such as text or image files. The static image data may replicate pages of a physical memory book. MemoryBooker Entries including media input will generally correspond to a digital "signing" of a Recipient's memory book and may include multiple forms of media as opposed to traditional "writing" placed in traditional memory books. As such the media input is generally related to the image data corresponding with selected Spatial Coordinates.

In some embodiments, the present disclosure includes a digital version of a memory book corresponding with an event or time period. Unlike social media, the Interactive MemoryBooker provides methods and apparatus to memorialize static images and private communications, essentially recreating a physical volume. In addition, the Interactive MemoryBooker goes beyond pen and ink as a recording medium and provides for more modern recording mediums, such as, for example, one or more of: a multi view digital image, a selfie with dimensional qualities, a voice over, an audio clip, a video clip, a digital time capsule of information that may only be opened at a later date, and a notification function that communicates to a signer when their message is being viewed.

According to the present disclosure, an image capture device or image generating device creates a static image of a page in a digital format, such as Adobe™ portable document format ("pdf format"). The static layout is mapped according to a Cartesian Coordinate such as, for example an X, Y coordinate or a vector value in combination with a start point and an angle. As a cursor passes over a static image, an opportunity to make an Interactive MemoryBooker Entry associated with the particular coordinates is presented to a MemoryBooker Signer. As such, a MemoryBooker Signature is a private communication from the MemoryBooker Signer to the MemoryBooker Owner that is associated with a particular place in the Memory book. The place in the Interactive MemoryBooker is designated according to a page and Cartesian Coordinate. In this manner, an Interactive MemoryBooker emulates a physical memory book. It includes private communication from a first person to a second person in the context of a specific pint of a memory book, and the MemoryBooker is associated with a specific academic organization year.

Additional embodiments may include other volumes associated with a specific event in time or period of time. Examples include a wedding, an anniversary, a reunion, company team building event, a religious confirmation, a bar mitzvah, a bat mitzvah, a baptism, a work project, or other event including renditions of static physical volumes and digital interactive communications.

According to some embodiments, a Memorybooker enabling apparatus includes a digital server accessible with a network access device via a digital communications network and executable software stored on the server and executable on demand. The software is operative with the server to cause the apparatus to transmit over the digital communications network a MemoryBooker interface comprising a plurality of images. The server will receive a designation of a Signing User and one or more selected images. The server will also receive a media input and a Cartesian Coordinate associated with the media input.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

The accompanying drawings are incorporated in and constitute a part of this specification, illustrate several embodiments of the disclosure and, together with the description, serve to explain the principles of the disclosure:

FIGS. 4B illustrates a web interface viewed by the main contact, the web interface includes functionalities that may be used to implement some embodiments of the present disclosure.

DETAILED DESCRIPTION

Figure 1A:
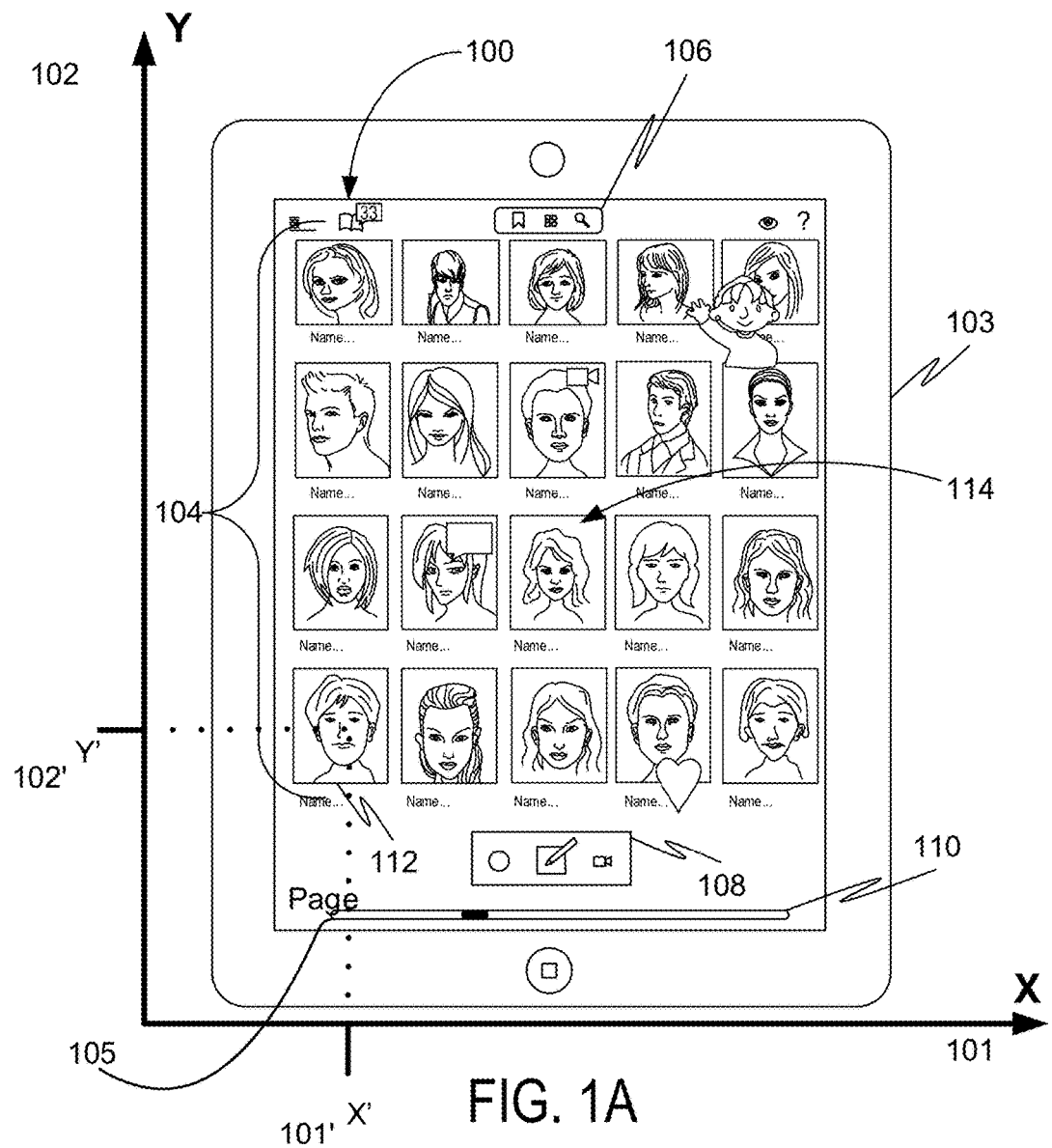
FIG. 1A illustrates block diagrams of exemplary user interfaces including functionalities that may be used to implement some embodiments of the present disclosure.

The present disclosure provides for apparatus and methods to generate images of a static MemoryBooker and associate MemoryBooker Entries with a spatial designation. In some embodiments, annotations may be presented on a transparent overlay and aligned with hardcopy MemoryBooker page content.

In general, an image capture device or image generating device creates a static image of a page in a digital format, such as Adobe™ portable document format ("pdf format"). The static image is associated with a system of spatial coordinates, such as Cartesian Coordinates or Polar Coordinates. For example X, Y coordinates or a vector value in combination with a start point and an angle. As a cursor passes over a static image, an opportunity to make an Interactive MemoryBooker Entry associated with particular coordinates associated with a positon of a cursor is presented to a MemoryBooker Signer. An entered MemoryBooker Signature is a private communication between a MemoryBooker Signers a MemoryBooker Owner that is associated with a particular place in the Memory book. The place in the Interactive MemoryBooker is designated according to a page and Spatial Coordinate. In this manner, an Interactive MemoryBooker emulates a physical memory book. It includes private communication from a first person to a second person in the context of a specific point of a memory book, and the MemoryBooker is associated with a specific academic organization year.

In some embodiments, a MemoryBooker index may associate a page and Spatial Coordinate with a subject. A subject matter may be a person's name, such as a family member or work colleague or faculty member's name; a group, such as department in and organization, a division, a location or other category.

In some embodiments, an apparatus includes a computer server accessible with a network access device via a digital communications network and executable software stored on the server and executable on demand. The software operative with the server to cause the apparatus to transmit over the digital communications network a MemoryBooker interface comprising a plurality of images, receive via the digital communications network a designation of Signing User selected image comprising the plurality of images, receive via the digital communications network an Cartesian Coordinate Communication associated with the Signing User selected image, receive via the digital communications network a suggested placement position of the Cartesian Coordinate Communication in the MemoryBooker interface, determine at least one user associated with the selected image and generate a MemoryBooker interface comprising the image and the Cartesian Coordinate Communication associated with the selected image, said MemoryBooker interface comprising the image and the Cartesian Coordinate Communication being available upon request to the at least one user associated with the selected image.

In some embodiments, MemoryBooker automated apparatus includes a processor and executable software, executable upon demand to allow a user to provide a MemoryBooker Entry on a student or other subject matter associated with a Spatial Coordinate.

In some embodiments, apparatus receives MemoryBooker Entry communications data and displays the resulting messages at places indicated in the receivers' digital memory book, provided the permission is granted by the receiver.

Executable software may be operative in conjunction with a processor to execute methodologies that display the resulting provide a MemoryBooker Entries or communication of personal expression.

In some embodiments, an apparatus is disclosed capable of embodying the innovative concepts described herein. Image presentation can be accomplished via any multimedia type interface. Embodiments can therefore include a PC, handheld, game controller; PDA, cellular or other mobile or handheld device, HDTV or other multimedia device with user interactive controls, including, in some embodiments, voice activated interactive controls.

Glossary:

As used herein the following terms will have the following associated meaning:

"MemoryBooker", "Digital Memory book" or "Virtual Memory book" as used herein means a web service providing user interfaces displaying static images associated with one or more of: work colleagues, family members and activities of an organization or familial group over a specified period of time. A user interface includes user interactive areas that allow users to interact with the memory book; for example, provide a MemoryBooker Entry on particular spatial coordinates.

"User" as used herein includes a person who operates a Network Access Device to access a MemoryBooker. Examples of Users may include one or more of: students, parents, teachers, organization coordinators and third party service providers such as printers, imagers, web service administrators.

"Main Contact" as used herein includes an organization representative, a human resources representative and a family coordinator. In some embodiments a main contact is endowed with administrator rights to the MemoryBooker Web Server.

"MemoryBooker Entry" or "Provide a MemoryBooker Entry" as used herein is a recorded Communication that corresponds with a Spatial Coordinate and page of a static media volume associated with a media owner. Examples of MemoryBooker Entries include one or more of: a text, a voice to text entry, a video segment, an audio file, an animation, an emoticon, a sticker, a finger paint, and a free-style drawing such as an autograph made with a digital finger paint or stylus-based digital paint and draw tools. In preferred embodiments, a MemoryBooker Entry is a one-user to one volume private message. In some embodiments, the MemoryBooker entry may be in "real-time" wherein no artificial delay is built in to the delivery of the entry.

"Mobile device" as used herein is a wireless mobile communications network access device for accessing a server in logical communication with a communications network. The mobile device may include one or more of a cellular, mobile or CDMA/GSM device, a wireless tablet phones, personal digital assistants (PDAs), "Mobile network" as used herein includes 2G, 3G, 4G internet systems and wireless fidelity (Wi-Fi), Wireless Local Area Network (WLAN), Worldwide Interoperability for Microwave Access (Wi-MAX), Global Mobile System (GSM) cellular network, spread spectrum and CDMA systems, Time division multiple access (TDMA), and Orthogonal frequency-division multiplexing (OFDM). The mobile device is capable of communicating over one or more mobile network.

"Network Access Device" as used herein refers to an electronic device with a human interactive interface capable of communicating with a Network Server via a digital communications network.

"One-to-One" as used herein refers to a MemoryBooker Entry that is recorded by one user directly on to a media volume, such as a MemoryBooker, of a second user and is not accessible by third party users.

"Spatial Coordinate" as used herein refers to a designation of a particular location on a page. Specific examples of Spatial Coordinate include Cartesian Coordinates and Polar Coordinates.

"User interface" or "Web interface" as used herein refers to a set of graphical controls through which a user communicates with a MemoryBooker. The user interface includes graphical controls such as button, toolbars, windows, icons, and pop-up menus, which the user can select using a mouse or keyboard to initiate required functions on the MemoryBooker interface.

"Wireless" as used herein refers to a communication protocol and hardware capable of digital communication without hardwire connections. Examples of Wireless include: Wireless Application Protocol ("WAP") mobile or fixed devices, Bluetooth, 802.11b, or other types of wireless mobile devices. 8 below.

"MemoryBooker" as used herein refers a collection of digital images, each respective image emulating a page from a physical memory book and associated with multiple areas identifiable via Spatial Coordinates. MemoryBooker Entries may be associated with the areas identifiable via Spatial Coordinates.

Referring now to FIG. 1A, a block diagram illustrates an exemplary user Network Access Device 103 with a MemoryBooker User Interface 100 displayed thereon. The user interface 100 includes functionalities that may be used to implement some embodiments of a MemoryBooker. Typically, a MemoryBooker user interface displays image data 104, such as images of students, in a MemoryBooker as seen by most or all users including students, parents, teachers and administrators. The students may be associated with a same learning institution, same sports team or same organization activity group. Alternatively, the image data 104 may be related to faculty of a organization or university, employees of a same company, members of a group, members of a family or other definable group of people.

The user interface 100 includes image data 104 associated with Spatial Coordinate positions 101-102. A user may designate a Spatial Coordinate 101' 102' and operate a User interactive control to provide a media entry associated with the Spatial Coordinate 101' 102'. Typically, the User media entry will be associated with an image correlating with the Spatial Designation, such as for example an image of a photograph of a student. A user interactive area 106 may receive input from a user and provide one or both of human readable content or human recognizable images.

In some preferred embodiments, a system of Spatial Coordinates 101-102 will not be ascertainable to a user. The user will make a selection of a Spatial Coordinate via a cursor control or touch screen input. For example, a user 112 may input a cursor click on area of a static image that includes a likeness of a student. The area associated with the first user 112 that receives the cursor click will be associated with one or more Spatial Coordinates 101' 102'. As illustrated, the Spatial Designations may be determined via a Cartesian Coordinate. Other embodiments may include a Polar Coordinate.

In various embodiments of the present disclosure, interactive areas may include, by way of a non-limiting example, one or more of: a) a user interactive area 106 that allows a user to search an index for Spatial Coordinates that correspond with subject matter, such as images or text descriptive of a particular person or subject; b) a user interactive area 108 that allows a user to provide a MemoryBooker Entry according to Spatial Coordinates and page selected; c) a user interactive area 110 that allows a user to scroll 105 to view content, such as images of students in the memory book. The user interface 100 may be provided by a software application installed on a network access device 103, such as a mobile device. Alternatively, the user interface 100 may correspond to a webpage obtained from a website. The software application or the website may interact with a MemoryBooker web service hosted on a computerized network server to provide the user interface 100 on the network access device 103.

A user, such as a first student, viewing the user interface 100 on a Network Access Device 103 may select an area associated with the first user 112 of a User Interface 100 that is associated with a subject a MemoryBooker Entry. In some embodiments, the MemoryBooker Entry may be for the benefit of a second user, such as a second student. The area selected by the first user 112 may, for example, include an image of themselves, or another subject.

An area may be selected according to Spatial Coordinates. The Spatial Coordinates designate a particular location on a User Interface. According to the present disclosure, portions of a static image of a MemoryBooker page, such as a pdf image may be associated with a particular subject. For example, Spatial Coordinates X' and Y' may be associated with an image the first student on a particular page Alternatively, a user may tap on Spatial Coordinates that correspond with a chosen subject, such as an image of a student, which may represent a second user 114, or use the user interactive area 106, which may comprise a search tool, and an associated index that matches Spatial Coordinates and page numbers with subject matter. After a particular Spatial Coordinate has been indicated, a user may make a MemoryBooker Entry into a MemoryBooker associated with a particular user. In some embodiments, a first user may enter a MemoryBooker Entry into multiple MemoryBooker volumes associated with multiple MemoryBooker owners in a single entry action by designating multiple destination MemoryBookers.

Figure 1B:
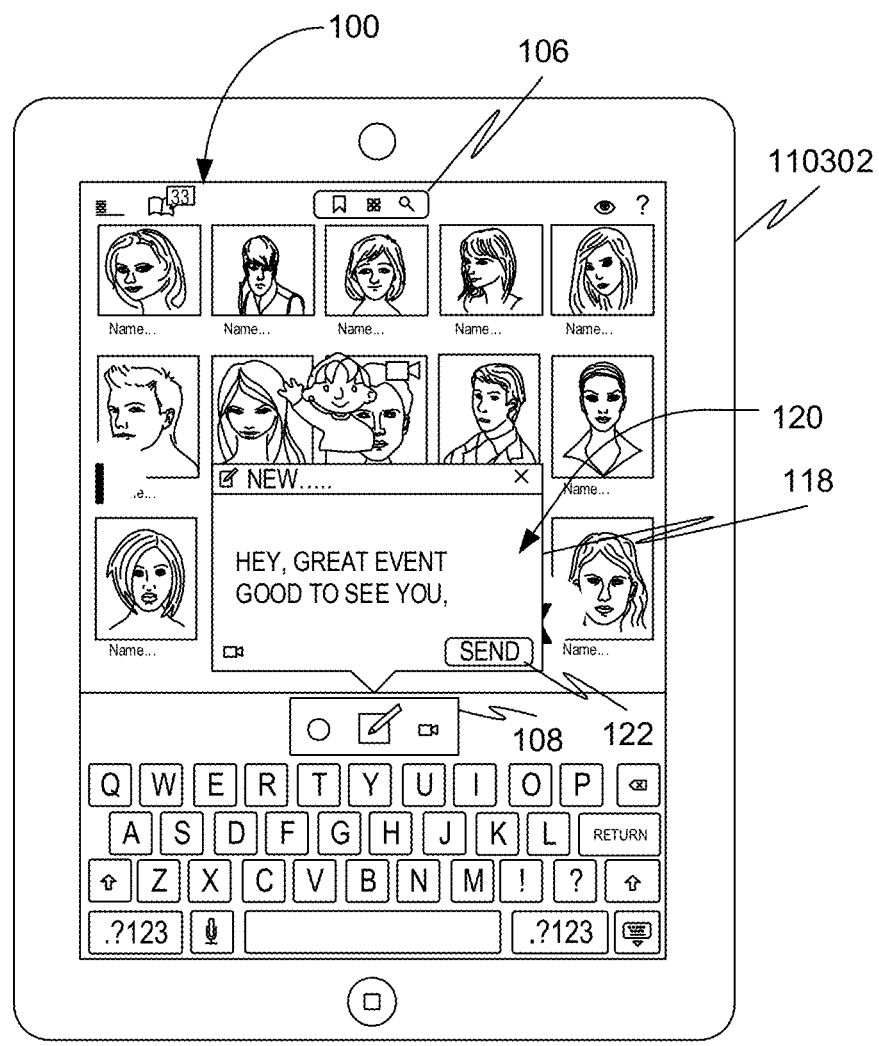
FIG. 1B illustrates block diagrams of exemplary user interfaces including functionalities that may be used to implement some embodiments of the present disclosure.

In some embodiments, the user interface 100 displays a text box 118 as shown in FIG. 1B. A first user may select a type of MemoryBooker Entry. MemoryBooker entries may include, for example, one or more of: a text message, an emoticon, free-style drawing, a video and an audio message. A user may select a type of MemoryBooker Entry an initiate its entry via an appropriate option from the user interactive area 108. Alternatively, when a user taps Spatial Coordinates associated with an image of a second user 114, or uses a user interactive area 106, which may comprise a search tool, the user interface 100 may show a drop down menu from which the first user 112 may select the type of a MemoryBooker Entry.

Further, in some embodiments, a speech-to-text converter may be used to convert an audio MemoryBooker Entry into text. Yet further, in some embodiments, the first user 112 may designate Spatial Coordinates associated with an image of the second user 114 and link a captured image (selfie) or initiate a video recording of the first user 112 speaking to the second user 114. The captured image or the recorded video is then uploaded on the MemoryBooker Web Server. A recorded image may be a "selfie" message recorded and uploaded. The first user 112 may also select a location for a MemoryBooker Entry on the user interface 100. Further, in some embodiments, the first user 112 may send the same message to the multiple students by selecting multiple students the user interface 100. Yet further, in some embodiments, the first user 112 may select an interest group or a family group and to send a same message to members selected as a group.

In some exemplary embodiments, the first user 112 selects an option from the user interactive area 108 provide a MemoryBooker Entry. Accordingly, the user interface 100 displays, referring to FIG. 1B the text box 118. Then, the first user 112 types a text 120 in the text box 118. The text 120 may read, for example: "Hey Bridget . . . great to see you! Finally, the first user 112 clicks on a "send" button 122 to submit the text 120. Further, when the text 120 is submitted, the mobile device of the first user 112 may determine the location of the first user 112 and send the location information along with the text 120 to the MemoryBooker Web Server. Further, in some embodiments, the location of the first user 112 may be displayed along with a MemoryBooker Entry on the user interface 100. In addition, a date and time stamp may be displayed along with a MemoryBooker Entry.

In some embodiments, each MemoryBooker Entry received by the MemoryBooker Web Server is associated with a universally unique identifier (UUID). The UUID may be referenced to track and manage MemoryBooker Entries.

In some additional embodiments, a MemoryBooker may include a dynamic book length feature wherein a user may add additional pages to a Memory Book. The additional pages may include images, text and/or video content. The additional pages may be designed and decorate to commemorate time spent by users together. Similarly, an interactive feature in a user interface may allow a User to click on an image and start a video associated with the image.

Figure 1C:
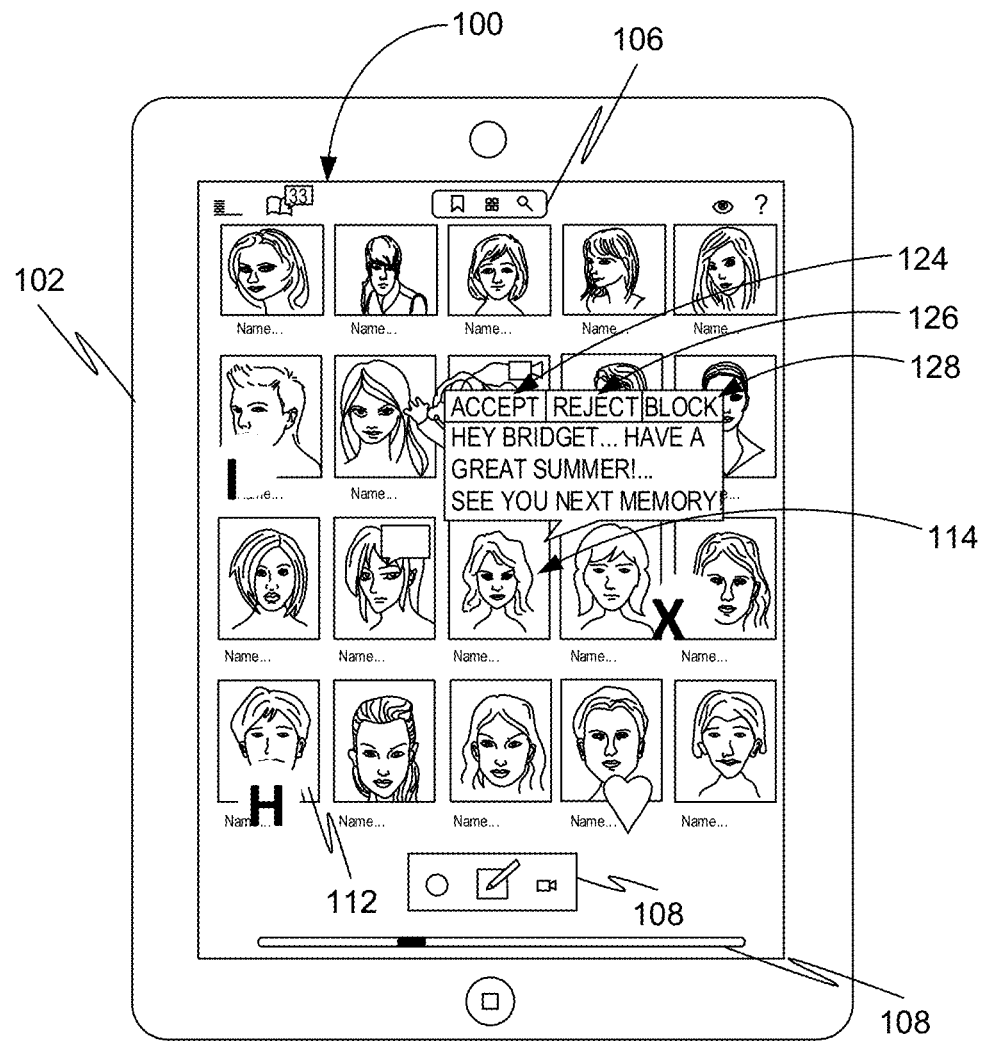
FIG. 1C illustrates block diagrams of exemplary user interfaces including functionalities that may be used to implement some embodiments of the present disclosure.

Referring now to FIG. 1C a user interface 100 is illustrated that may be displayed on a mobile network access device of the second user 114. The MemoryBooker Web Server may transmit a notification to the second user 114, wherein the notification includes information about a MemoryBooker Entry received from the first user 112. As shown, in some embodiments, the user interface 100 conveys the displays the MemoryBooker Entry, such as a text 120 message submitted by the first user 112 for the second user 114. The user interface 100 allows the second user 114 to accept or reject the MemoryBooker Entry with text 120 by using an interactive control, such as one of an "accept" button 124 and a "reject" button 126.

If the second user 114 rejects the MemoryBooker Entry with text 120, it does not become associated with the MemoryBooker, or other media volume associated with the second user 114. Some embodiments may also include a "block" function 128, which may be used to completely block the first user 112 from sending more MemoryBooker Entries. For example a second user 114 may use the "block" button 128 if the text 120 is inappropriate; when the second user 114 does not know the first user 112; or if the second user 114 simply does not wish to receive MemoryBooker Entries from the first user 112. A student may also be able to "white list" messages and or provide a MemoryBooker Entries by activating functionality to: "Accept messages from a source", such as, for example, a user identified as Student 123.

Figure 1D:
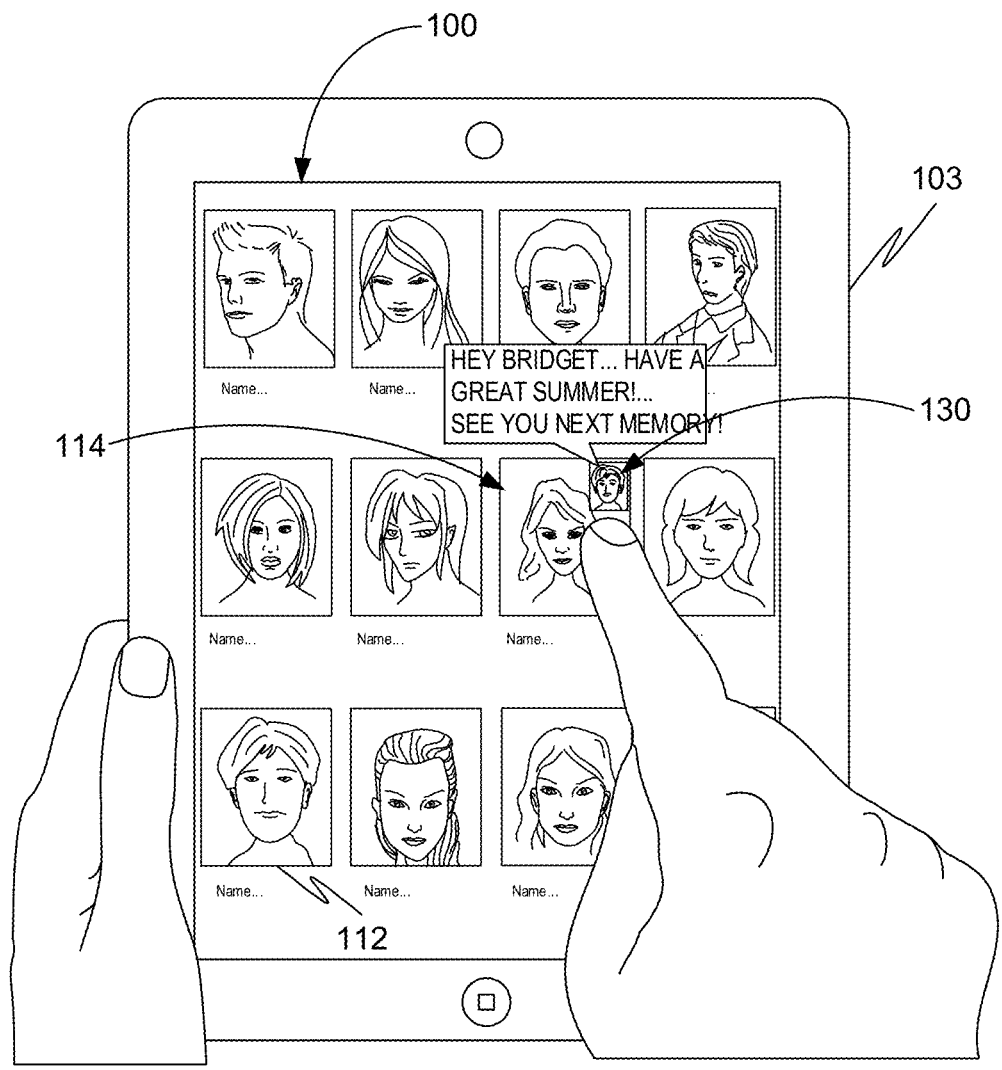
FIG. 1D illustrates block diagrams of exemplary user interfaces including functionalities that may be used to implement some embodiments of the present disclosure.

Referring now to FIG. 1D an illustration of the user interface 100 viewed by the second user 114. The user interface 100 showing the accepted MemoryBooker Entry in places as seen by the second user 114. Next to the second user's 114 large image, there is a small icon 130 with the image of the first user 112. The user interface 100 places the accepted provide a MemoryBooker Entries on a digital provide a MemoryBooker Entry layer on top of the students' images, allowing the second user 114 to turn-on and turn-off a MemoryBooker Entry layer to make it visible and invisible respectively.

In some aspects, multiple users may send private one-to-one messages to other students, and respective users may accept or reject MemoryBooker Entries individually; therefore, each user may view and own a different digital copy of their MemoryBooker. For example, the first user 112 may provide a MemoryBooker Entry on multiple students. Some of the students may accept a MemoryBooker Entry and some may reject. Accordingly, each user may view a different version of the same memory book.

Web Interface

Figure 2:
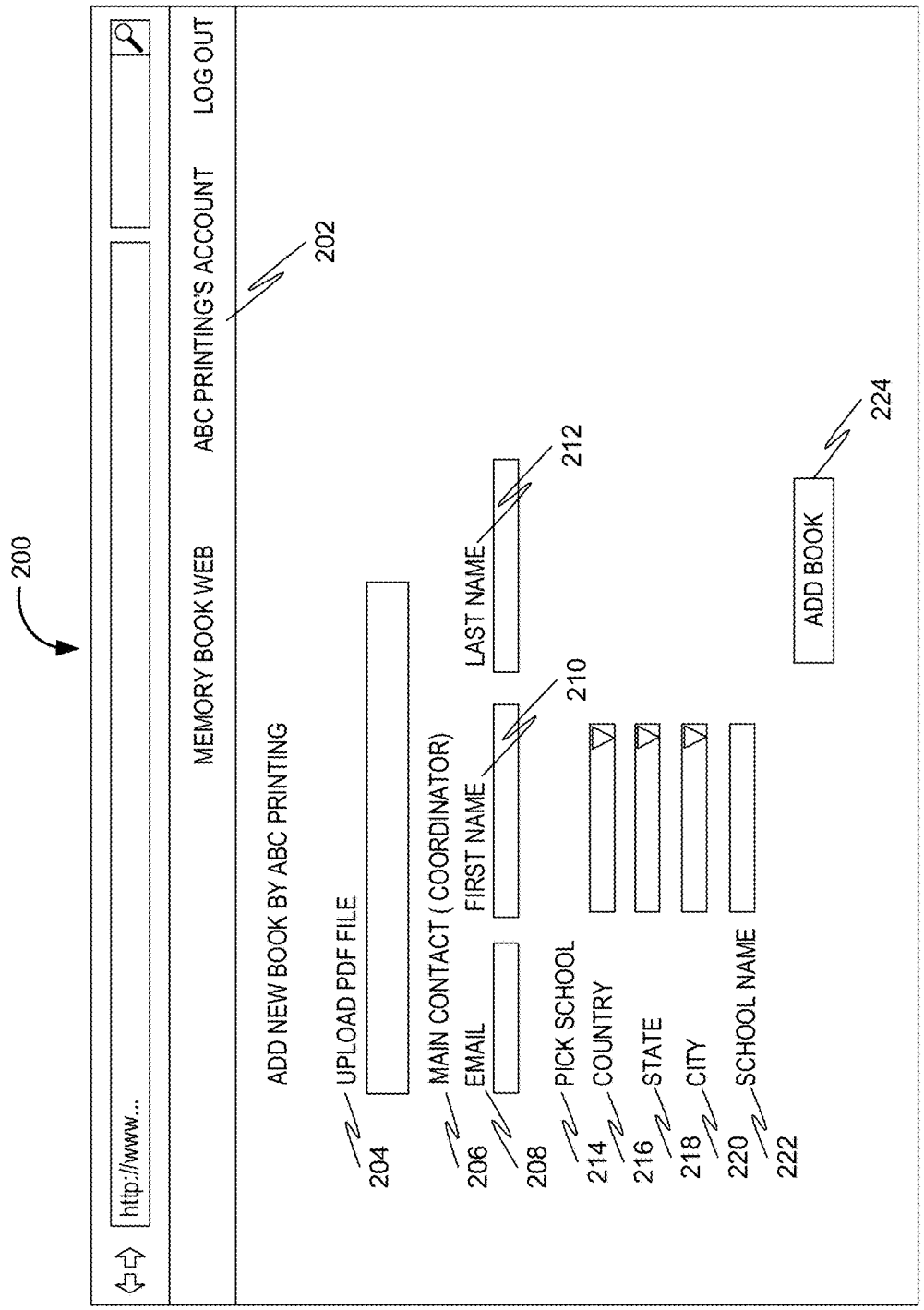
FIG. 2 illustrates a web interface viewed by an administrator, the web interface including functionalities that may be used to implement some embodiments of the present disclosure.

Referring now to FIG. 2 an illustration of a web interface 200 according to some aspects of some embodiments of the present disclosure. The web interface 200 includes functionalities that may be used to implement some embodiments of the present disclosure. The web interface 200 may include a representation of a static image correlating with a MemoryBooker page and Spatial Coordinates corresponding with areas of each static image. The third party service provider may be a printing company (such as ABC printing 202) that specializes in preparing memory books or an Internet company providing the MemoryBooker Web Server to learning institutions to upload and view their memory books.

In some embodiments, the web interface 200 includes a web form that allows an administrator to add a new MemoryBooker to the MemoryBooker Web Server. The administrator may upload a new MemoryBooker book using an "Upload PDF file" form field 204. Further, the new book may be uploaded in one of PDF, DOC, DOCX, PPT and PPTX formats. Next, the administrator may add a main contact for the MemoryBooker using a "Main Contact" form field 206. The "Main Contact" form field 206 allows the administrator to provide an email address 208, a first name 210 and a last name 212 of the main contact. A "Pick " form field 214 allows the administrator to include organization information such as a country 216, a state 218, a city 220 and a organization name 222. Further, the "Pick Organization" form field 214 may allow the administrator to fill in a year, a group and a title of the MemoryBooker (not shown). In addition, the administrator may use an "Add book" button 224 to submit the static memory book images to the MemoryBooker Web Server. Once the static memory book entries are uploaded with most or all the required information, the MemoryBooker Web Server generates a unique master book ID per upload. The book ID may be generated in the format: "organization name_year_group/title name". The MemoryBooker Web Server provides a confirmation when the book is uploaded successfully.

The MemoryBooker Web Server may provide access to memory books to users including, for example: students, faculty and parents in exchange for a payment. Further, advertisements may be added to the web interfaces (including the web interface 200) provided by the MemoryBooker Web Server. Some examples of the advertisements include banner advertisements, pop-up advertisements, and the like. The administrator may provide hyperlinks to specific advertisements, such as, by way of non-limiting example, for framed or poster board versions of MemoryBooker images and MemoryBooker Entries, for products that may interest the users, for a fundraiser for the organization or other purpose. Alternatively, the administrator may provide advertisements using a third-party Internet advertising network including for instance Google Adwords®, Facebook Ads®, or Bing® Ads. The third-party internet advertising networks may provide contextual advertisements.

Further, web interfaces may allow an administrator to manage accounts, create user accounts, reset passwords, delete books and add books on the MemoryBooker Web Server. Moreover, the web interfaces may provide one or more features to the administrators including defining administrator rights, selecting administrator users, re-uploading book PDF, updating book information, inviting users, un-inviting users, sending incremental invites, displaying user statistics, inserting new pages to the MemoryBooker Web Server , tracking revenue details and managing advertisements.

Figure 3:
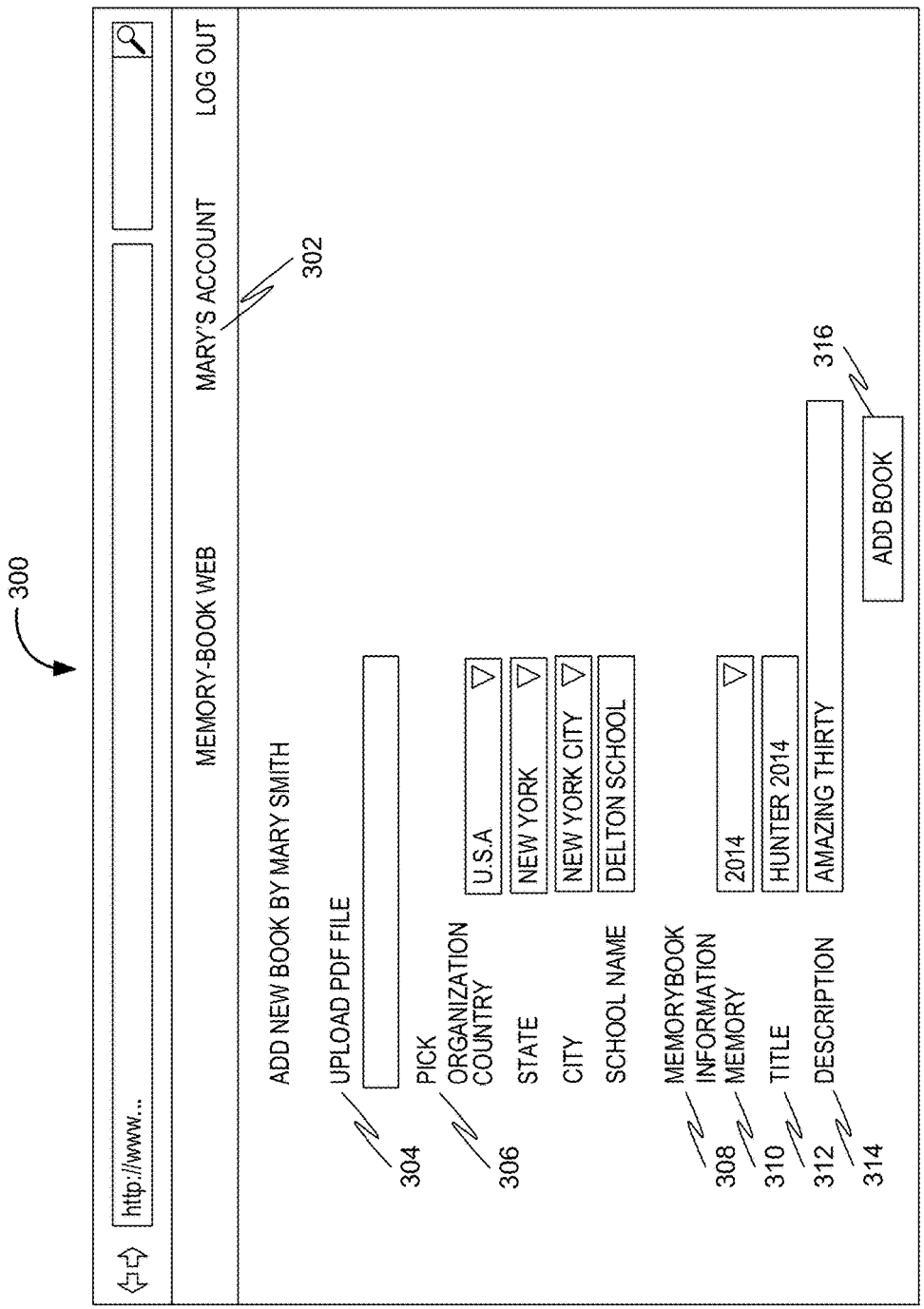
FIG. 3 illustrates a web interface viewed by a main contact, the web interface includes functionalities that may be used to implement some embodiments of the present disclosure.

Referring now to FIG. 3 a web interface 300 is illustrated, that may be viewed by a main contact (i.e. Mary 302). The web interface 300 includes functionalities that may be used to implement some embodiments of the present disclosure. The web interface 300 may, for example, include a web form that allows Mary 302 to add a new memory book to the MemoryBooker Web Server. The web interface 300 is similar to the web interface 200 explained in detail in conjunction with FIG. 2 above.

Functionality may include, for example, uploading static images of a media volume, such as a MemoryBooker. An "upload PDF file" form field 304 allows for uploading one or more static images associated with a MemoryBooker or other volume. A "Pick Organization" form field 306 associates the uploaded static images with a particular organization. Other embodiments may include static images of a volume associated with a group of people, such as a family, a company, a department, or other definable group. The web interface 300 may further include "memory book information" form fields 308 year 310, a title 312 and a description 314. Once the required information is provided, a user such as Mary 302 may use an "Add Book" button 316 to submit the memory book to the MemoryBooker Web Server.

Additional functionality may include printing MemoryBooker entries on a transparent medium, such as an velum or acetate page and arranging for the transparency to be inserted over a physical Memory Book. The spatial coordinates of the MemoryBooker entries will align with the designated location for a MemoryBooker entry.

Figure 4A:
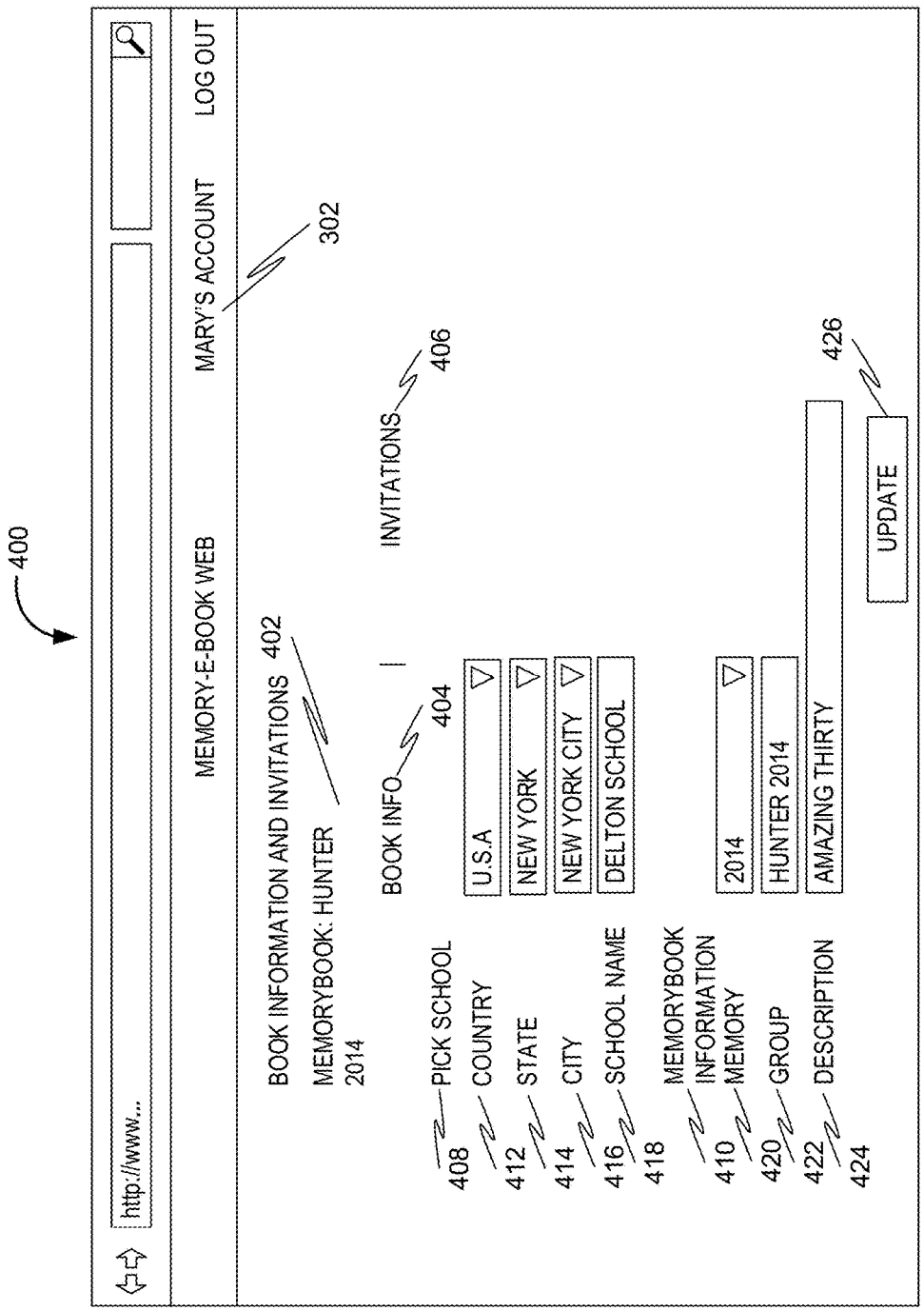
FIGS. 4A illustrates a web interface viewed by the main contact, the web interface includes functionalities that may be used to implement some embodiments of the present disclosure.

Referring now to FIG. 4A an illustration of a web interface 400 viewed by Mary 302, the web interface 400 includes functionalities that may be used to implement some embodiments of the present disclosure. In some embodiments, web interface 400 may include a web form that allows Mary 302 to update a memory book. The web interface 400 shows that a title 402 of the memory book is "Hunter 2014". Further, the web interface 400 may show two or more tabs such as: a "book info" tab 404 and an "invitations" tab 406. When the "book info" tab 404 is selected, the web interface 400 shows the fields "pick organization" 408 and "memory book information" 410. The "pick organization" field further includes one or more fields including a country 412, a state 414, a city 416, and a organization 418. In the example shown, the country 412 is "U.S.A", the state 414 is "New York", the city 416 is "New York City", and the organization 418 is "Delton Organization". The "memory book information" field 410 further includes one or more fields including a year 420, a group 422 and a description 424. In the example shown, the year 420 is "2014", the group 422 is "Hunter 2014" and the description 424 is "Amazing thirty". Once the required information is provided, the main contact uses an "update" button 426 to update the memory book.

Figure 4B:
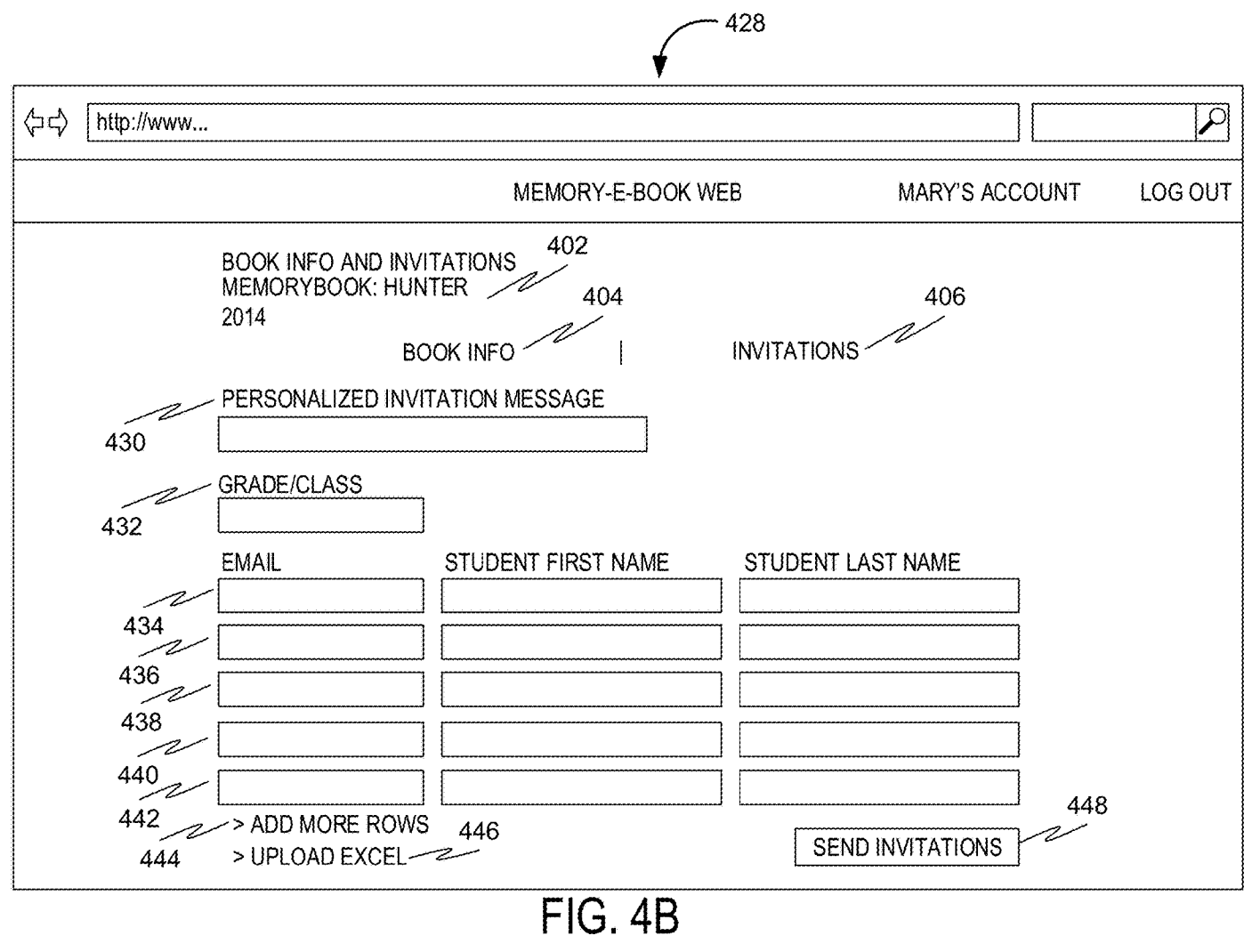

Referring now to FIG. 4B an illustration of a web interface 428 viewed by Mary 302, when the "invitations" tab 406 is selected by Mary 302. Mary 302 may send invitations to users (including students and parents) using the web interface 428. Mary 302 enters an invitation message in a "personalized invitation message" field 430. If a personalized invitation message is not provided, then a default message is used. Further, a "grade/class" field 432 is used to indicate the appropriate grade or class. Yet further, the web interface 428 shows a list of rows 434, 436, 438, 440 and 442. Each row 434, 436, 438, 440 and 442 allows Mary 302 to provide details for a user including email, first name and last name of the user. Mary 302 may manually fill in the rows 434, 436, 438, 440 and 442. Further, more rows may be added using an "add more rows" feature 444. Alternatively, Mary 302 may upload a Microsoft EXCEL® document containing the details of the students using an "upload excel" feature 446. The MemoryBooker Web Server automatically parses the uploaded Microsoft EXCEL® document to obtain names and email addresses of users. Finally, Mary 302 sends out the invitations using a "send invitations" button 448. Thereafter, the MemoryBooker Web Server generates a unique book view ID for each student. The book view ID may be prepared in format such as "book ID Email member's name member". This book view ID is included in the invitation message sent to most or all users. Further, the invitation message may include a hyperlink to the memory book, which when activated directs the user to the relevant memory book on the MemoryBooker Web Server. For each invitation, the MemoryBooker Web Server may receive an acknowledgement indicating a successful or a failed delivery.

Application User Interface

Figure 5A:
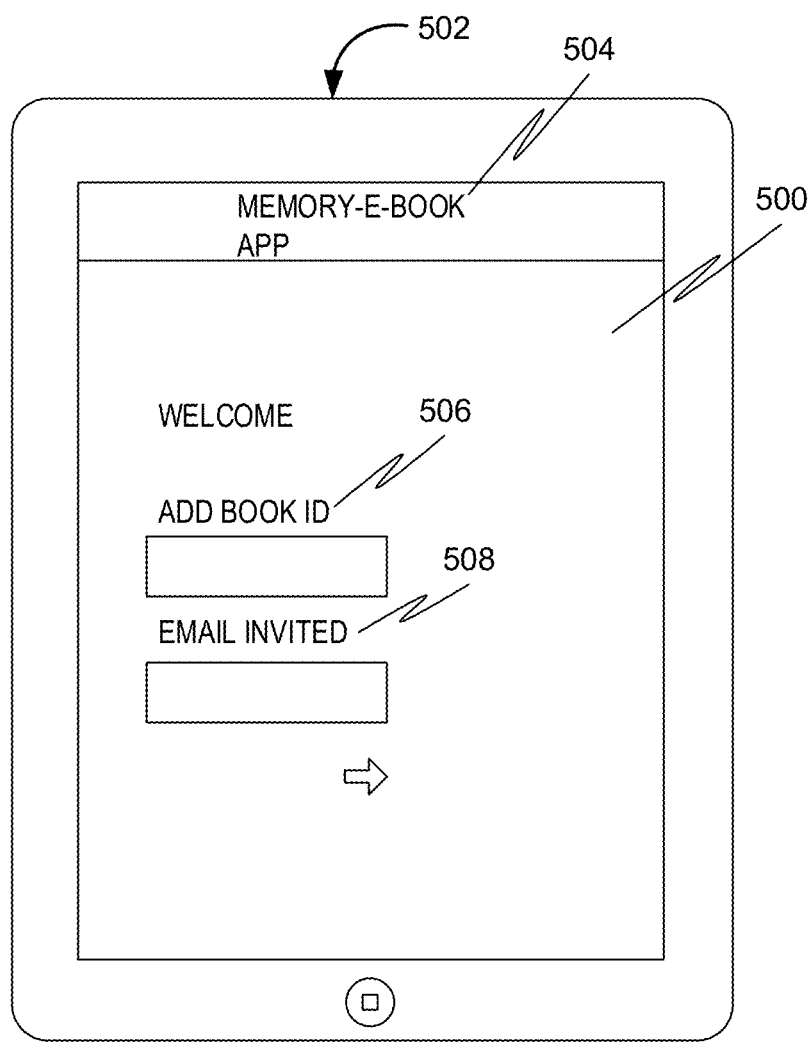
FIGS. 5A illustrates an application user interface viewed by a user, the application user interface includes functionalities that may be used to implement some embodiments of the present disclosure.

Referring now to FIG. 5A an illustration of an application user interface 500 viewed by a user (a student or a parent) on a mobile device 502, the application user interface 500 includes functionalities that may be used to implement some embodiments of In some embodiments,. The application user interface 500 may be displayed when the user receives the invitation message from Mary 302 and follows the hyperlink provided in the invitation message to access the relevant memory book. The application user interface 500 may be provided by a "MemoryBooker" application 504 installed on the mobile device 502. However, if the "MemoryBooker" application 504 is not already installed on user's mobile device 502, then the user may be prompted to install the "MemoryBooker" application 504. For example, the mobile device may be an Android™ iOS™ or other operating system based device. In some embodiments, a user may access an application providing website such as Apple, Google Play, Amazon or other App store to install a "MemoryBooker" application 504.

Figure 5B:
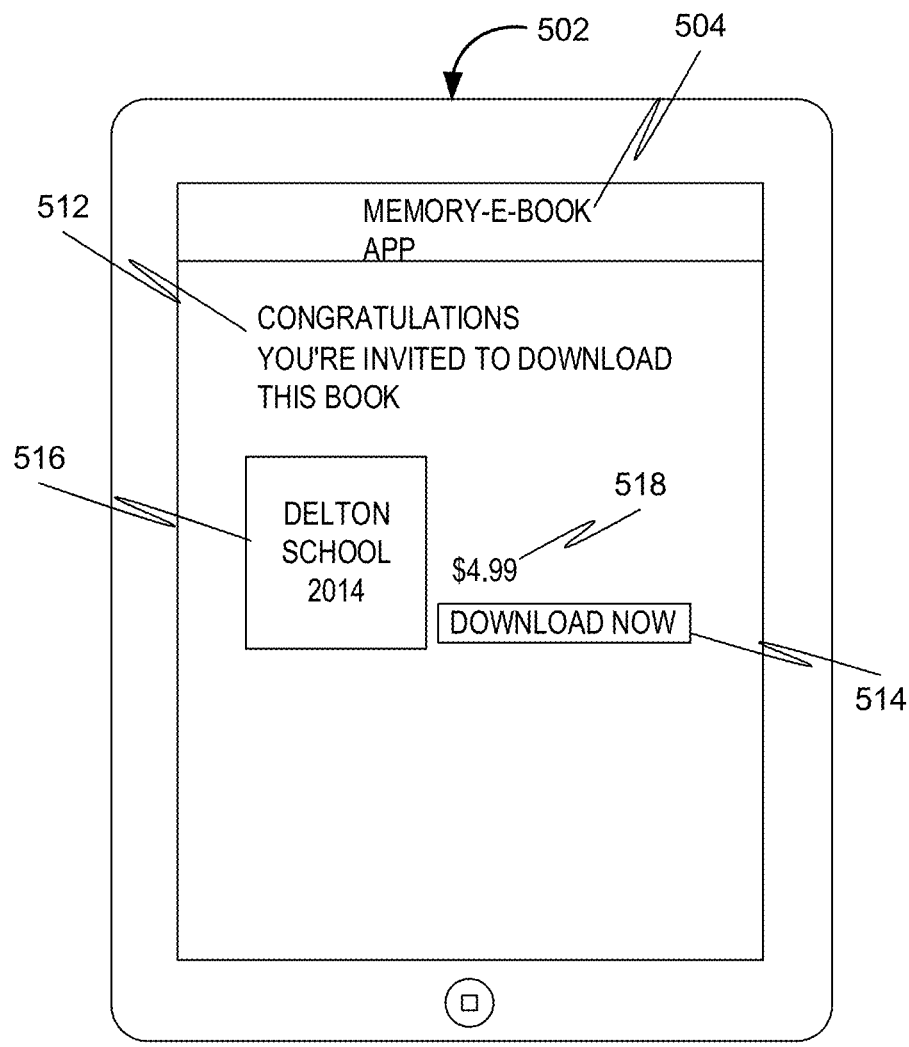
FIGS. 5B illustrates an application user interface viewed by a user, the application user interface includes functionalities that may be used to implement some embodiments of the present disclosure.

The application user interface 500 is a web form including an "add book ID" field 506 and an "email invited" field 508. The user enters the book view ID obtained from the invitation email into the "add book ID" field 506 and the email ID in the "email invited" field 508. If the book view ID and the email ID are correct, the "MemoryBooker" application 504 displays an application user interface 512 on the mobile device 502 as shown in FIG. 5B. The application user interface 512 provides a "download" button 514 that allows the user to download "Delton Organization 2014" memory book 516 shared by Mary 302 via the invitation message. The "Delton Organization 2014" memory book 516 may be provided at a price. As shown, the application user interface 512 displays a price 518 of the "Delton Organization 2014" memory book 516 to be $4.99. Accordingly, the "MemoryBooker" application 504 also provides a payment workflow that allows the users to pay the required amount. Further, the revenue generated by selling the memory books may be shared among one or more of an Internet company providing the MemoryBooker Web Server, a local printer and a organization. Accordingly, the MemoryBooker Web Server tracks revenue sharing details. In an alternate embodiment, the user accesses the hyperlink in the invitation message and the relevant memory book is automatically downloaded and added to the "MemoryBooker" application 504 installed on the user's mobile device 502. Further, the "MemoryBooker" application 504 provides a feature for batch migrating memory books to another mobile device.

Figure 6:
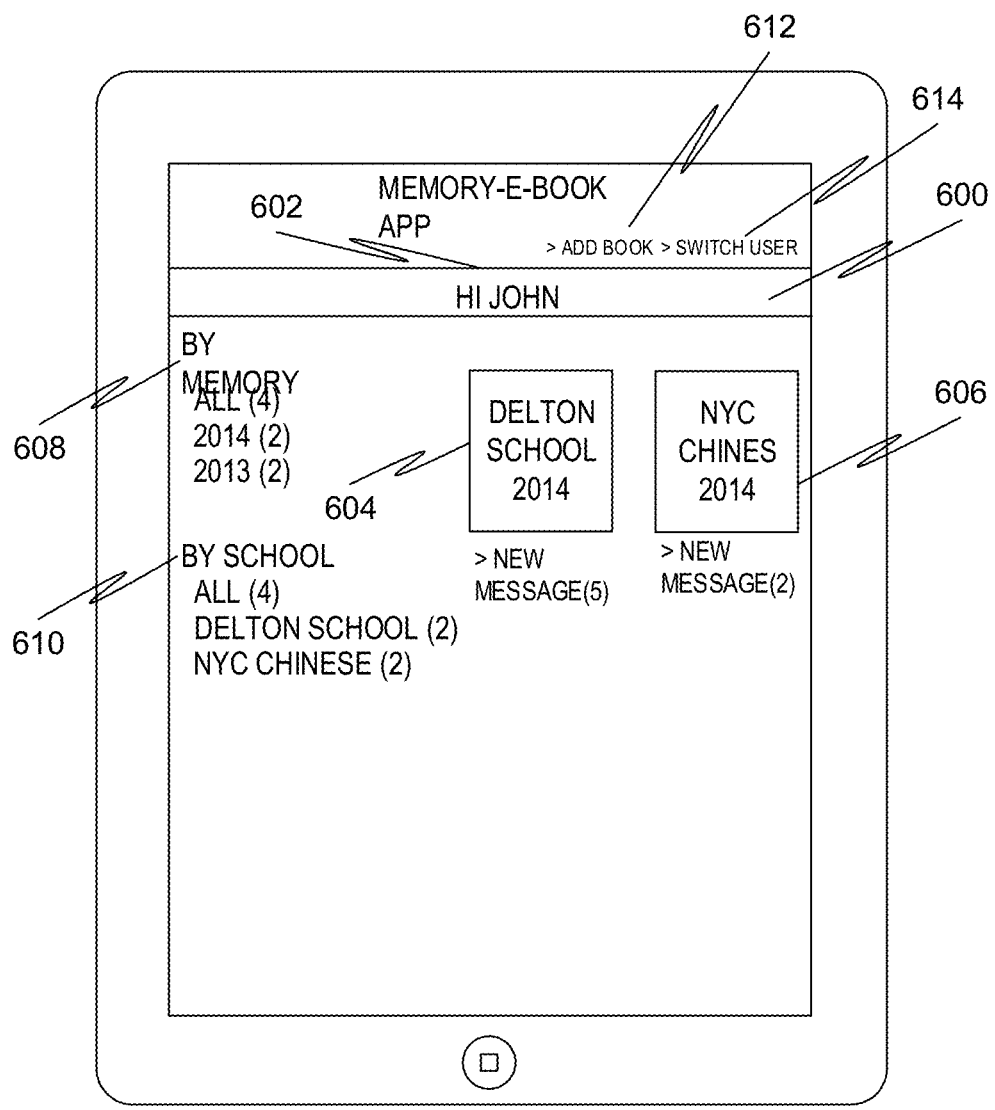
FIG. 6 illustrates an application user interface viewed by a user, the application user interface includes functionalities that may be used to implement some embodiments of the present disclosure.

Referring now to FIG. 6, an application user interface 600 that may be presented to a user (i.e. John 602) is illustrated. In some embodiments, the application user interface 600 includes functionalities that may be used to implement various aspects of the present disclosure. Some embodiments may include an application user interface 600 that presents memory books that John 602 has access to; for example, a "Delta Organization 2014" memory book 604 and a "NYC Chinese 2014" memory book 606. Further, John 602 may access memory books by selecting an appropriate year from a list 608 or by selecting an appropriate organization from a list 610. Further, John 602 can add more memory books using an "add book" button 612. When the "add book" button 612 is activated, John 602 is shown the application user interface 500.

In another aspect, the mobile device may be shared among multiple users. Accordingly, a "Switch User" button 614 may be used to switch the "MemoryBooker" application 504 among multiple users. Further, the "MemoryBooker" application 504 allows a user to send messages to another user across memory books. For example, a user in the "Delton Organization 2014" memory book 604 may send a message to another user in the "NYC Chinese 2014" memory book 606. Further, the "MemoryBooker" application 504 allows a user to send personal notes to another user, wherein the personal notes are not publicly accessible. Moreover, a user may invite relevant users from the "MemoryBooker" application 504. For example, a student may invite his parents or friends outside organization to access the memory book.

Figure 7A:
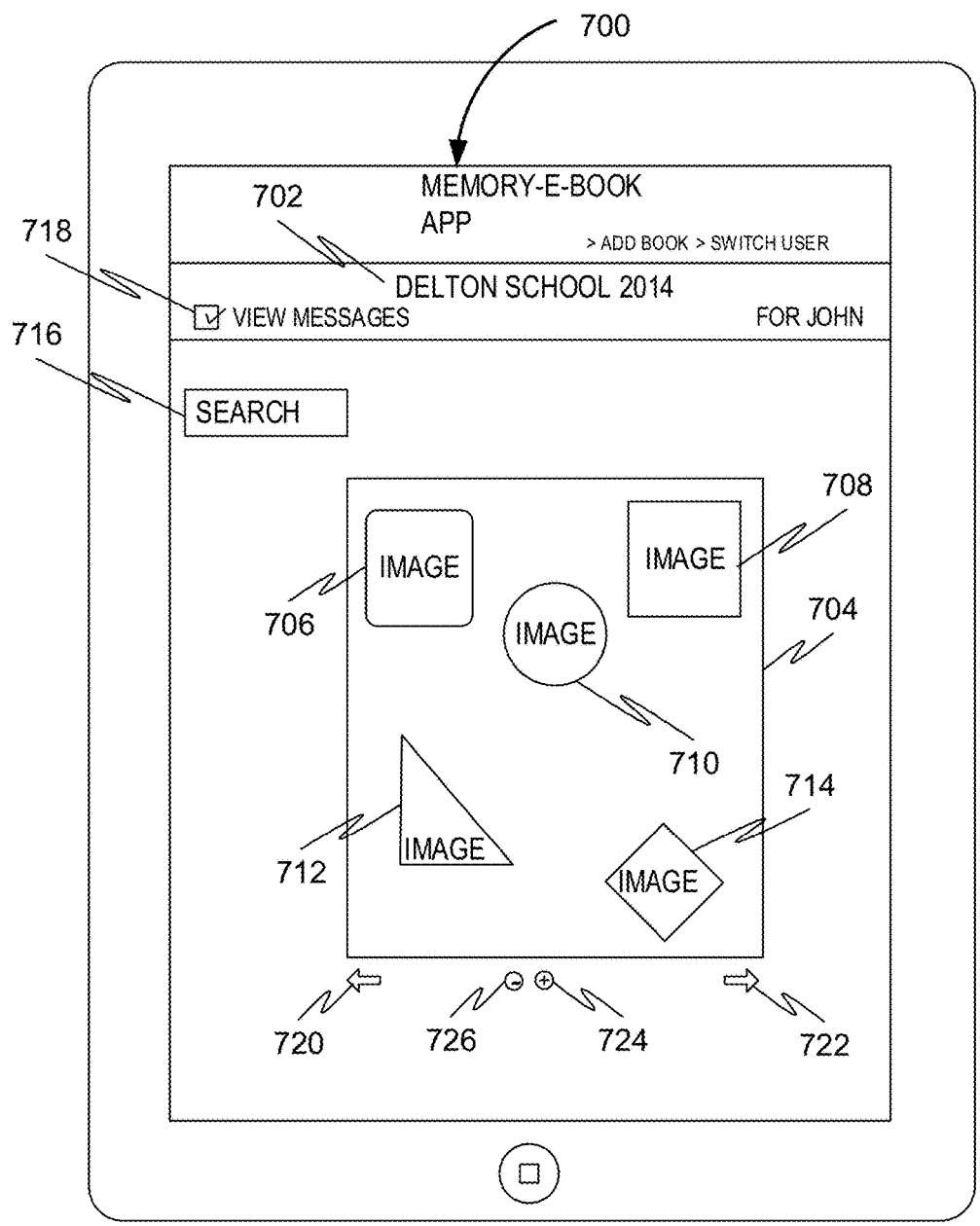
FIGS. 7A illustrates an application user interface viewed by a user, the application user interface allows the user to annotate images according to some embodiments of the present disclosure.

Referring now to FIG. 7A an application user interface 700 is illustrated with an exemplary memory book presented as "Delton organization 2014" memory book 702 to John 602. The application user interface 700 includes a user interactive area 704 showing images 706, 708, 710, 712 and 714. The images 706, 708, 710, 712 and 714 include images of students in the "Delton Organization 2014" memory book 702, image provide a MemoryBooker Entries shared by students and icons. John 602 may search students and messages using a "Search" button 716. Further, John 602 may view messages or hide messages using a "view images" radio button 718. The "view images" radio button 718 allows John 602 to turn-on or turn-off a MemoryBooker Entry layer. John 602 may turn pages to view other students using arrows 720 and 722. In addition, John 602 may zoom-in or zoom-out of the user interactive area 704 using the controls 724 and 726 respectively.

Figure 7B:
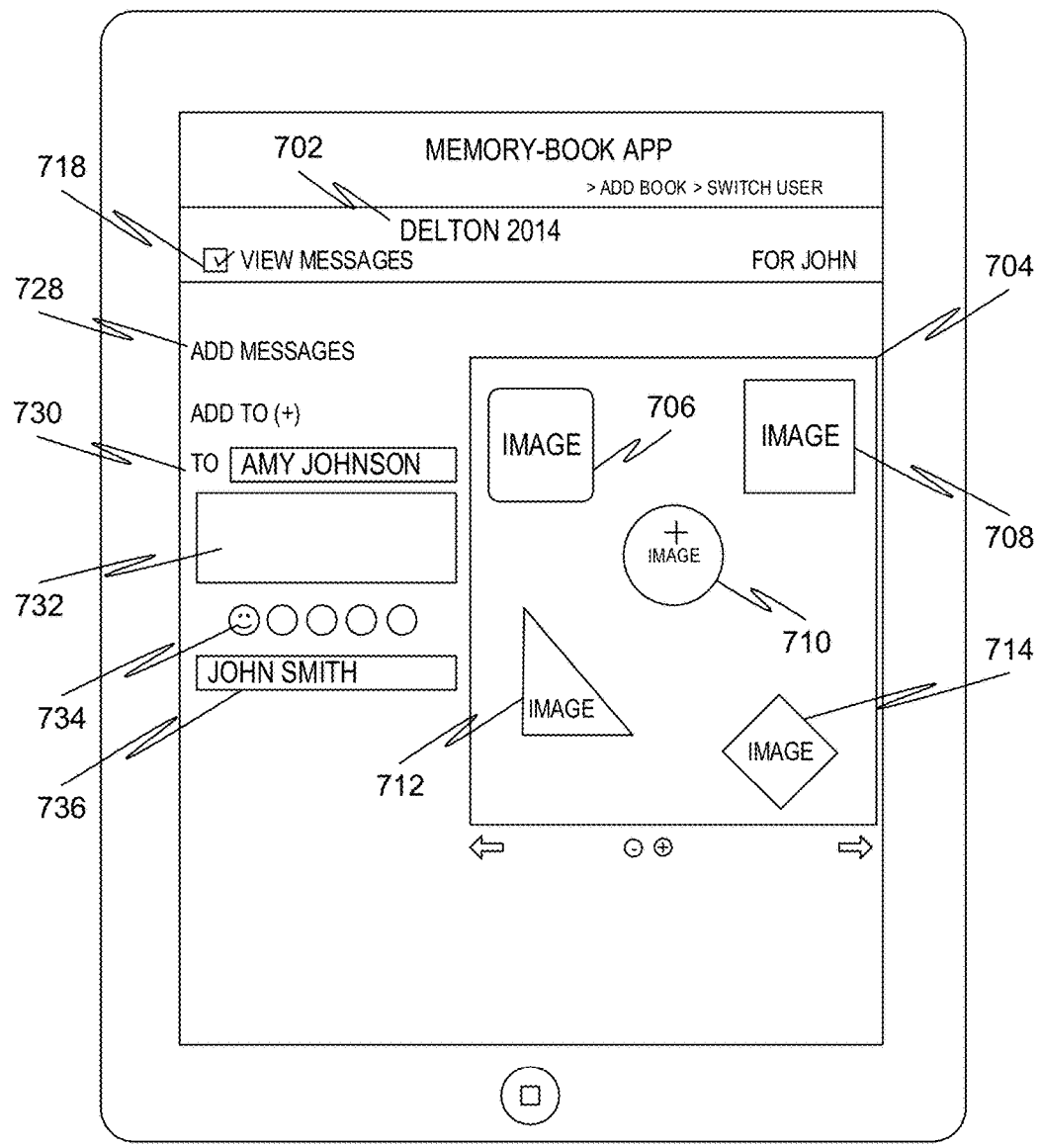
FIGS. 7B illustrates an application user interface viewed by a user, the application user interface allows the user to annotate images according to some embodiments of the present disclosure.
Figure 7C:
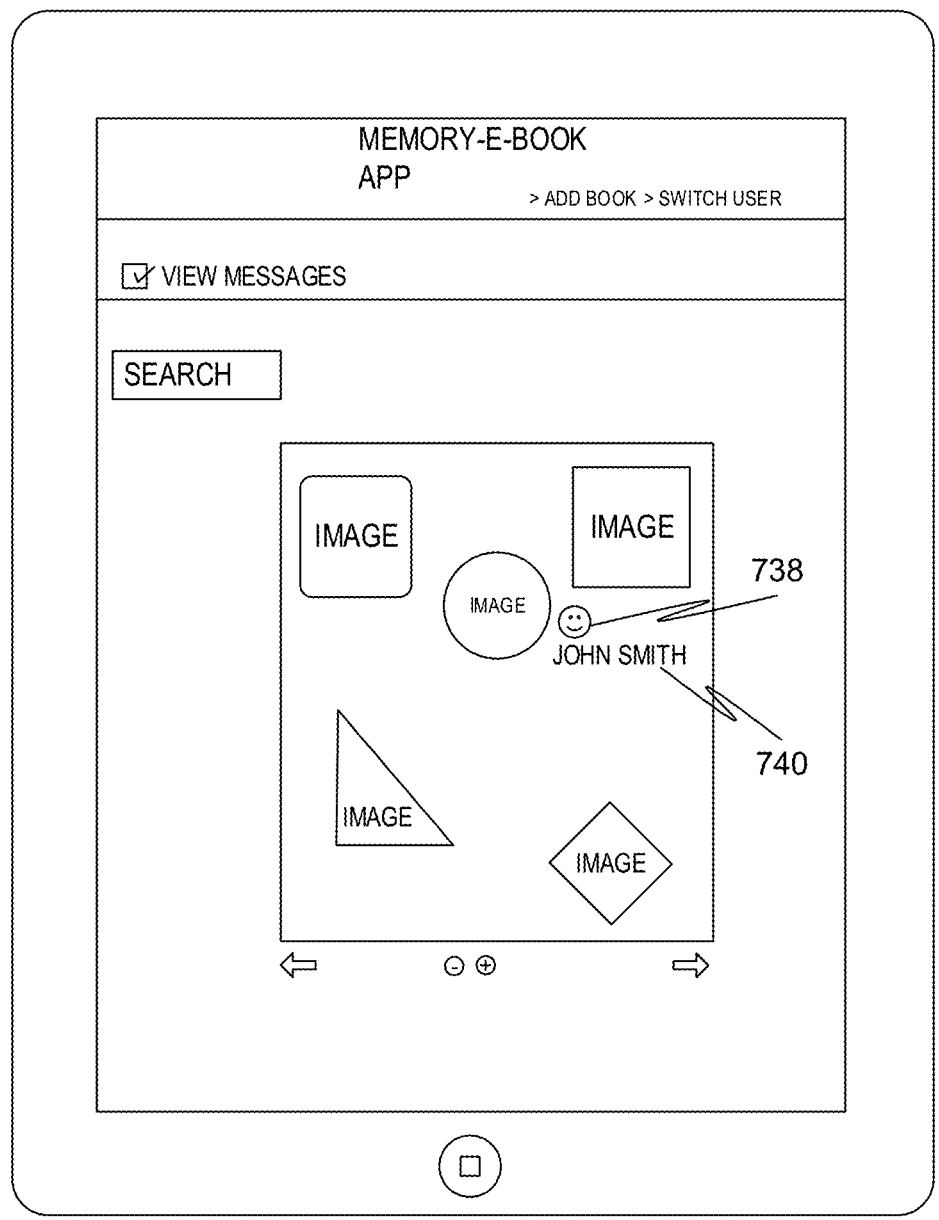
FIGS. 7C illustrates an application user interface viewed by a user, the application user interface allows the user to annotate images according to some embodiments of the present disclosure.

John 602 may input MemoryBooker Entries for students shown in user interactive area 704. Accordingly, John 602 may select Spatial Coordinates associated with an image, for example, the image 710 from the application user interface 700. Referring now to FIG. 7B, in response to selection of the image 710, the "MemoryBooker" application 504 shows an "add messages" field 728. The "add messages" field 728 further includes a "To" field 730 showing the name of the student ("Amy Johnson") in the selected image 710. In some embodiments, the user may add a MemoryBooker Entry in a text area field 732 and add an emoticon 734. The name of the user (i.e. "John Smith") providing a MemoryBooker Entry may be displayed in a field 736. John 602 may submit a MemoryBooker Entry 738 wherein an emoticon is placed next to the image 710 as shown in FIG. 7C. The name of a MemoryBooker Entry author ("John Smith") 740 may also displayed next to a MemoryBooker Entry 738.

In some embodiments, a user, such as John 602 may also provide an image of a MemoryBooker Entry including an image, a sticker or a signature, a video as a MemoryBooker Entry, an audio provide a MemoryBooker Entry, a free-style drawing and a data package comprising contact information. Further, the "MemoryBooker" application 504 offers in application merchandize such as stickers, emoticons, icons etc. The users may purchase the merchandize and use to provide a MemoryBooker Entry in a memory book. The second student ("Amy Johnson") receives notification about a MemoryBooker Entry 738. The "MemoryBooker" application 504 allows a second student to accept or reject a MemoryBooker Entry 738. Further, the second student may report spam or inappropriate message and block John 602 from posting provide a MemoryBooker Entries in future. The "MemoryBooker" application 504 also provides latest activity summary to the users.

Further, a Memory book server may define various types of users including printer representative, organization representative, parent, and student. For each user type, the MemoryBooker Web Server may define access rights to features of the MemoryBooker Web Server. In an exemplary embodiment, the MemoryBooker Web Server administrator may auto-generate emails and send them to users, and create accounts for various users.

A printer representative may be granted rights to upload static images, such as a PDF images. A parent user may be allowed to set read or write permission settings for their wards. A student user may be allowed to receive invitation email to access a memory book, self-identify with an image in the memory book, view the memory book, add messages to the memory book, receive message read notices, receive new message notices, receive weekly reminder of new messages or activities and report spam provide a MemoryBooker Entry. In some embodiments, a organization administrator may be provided with functionality to designate a MemoryBooker administrator user.

Mobile Device

Figure 8:
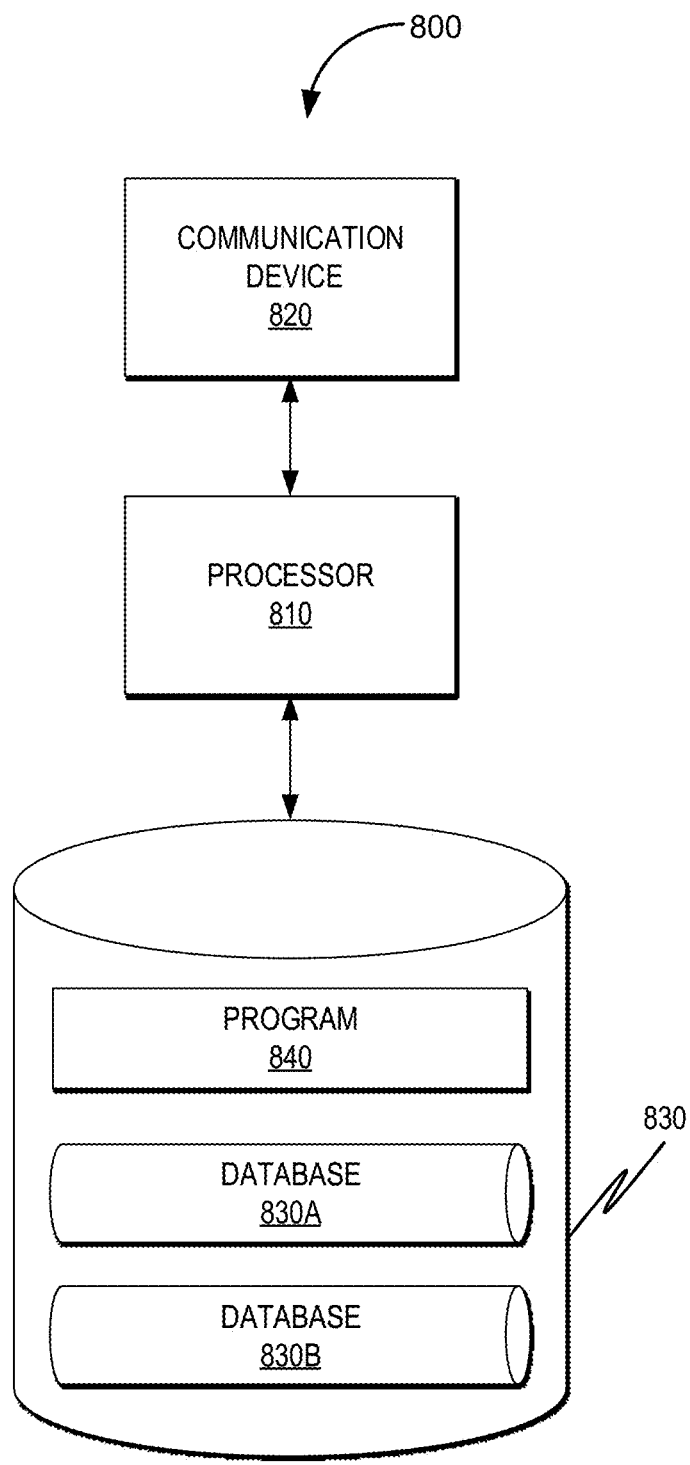
FIG. 8 illustrates a block diagram illustrating a controller that may be embodied in one or more of mobiles devices and utilized to implement some embodiments of the present disclosure.

Referring now to FIG. 8, an illustration is provided with a controller 800 that may be embodied in one or more of communications accessible devices and utilized to implement some embodiments of In some embodiments,. Communications accessible devices may include, by way of example, a hand held device such as a cellular phone, a pad device, a personal computer, a server, a personal digital assistant, an electronic reader device or other programmable device.

The controller 800 comprises a processor 810, which may include one or more processors, coupled to a communication device 820 configured to communicate via a communication network, such as the Internet, or another cellular based network such as a 3G or 4G network (not shown in FIG. 8). The communication device 820 may be used to communicate with a digital communications network, such as, for example, the Internet available via the Internet Protocol, or a cellular network such as 3G or 4G.

The processor 810 is also in communication with a storage device 830. The storage device 830 may comprise any appropriate information storage device, including combinations of electronic storage devices, such as, for example, one or more of: hard disk drives, optical storage devices, and semiconductor memory devices such as Random Access Memory (RAM) devices and Read Only Memory (ROM) devices.

The storage device 830 can store a program 840 for controlling the processor 810. The processor 810 performs instructions of the program 840, and thereby operates in accordance with software instructions included in the program 840. The processor 810 may also cause the communication device 820 to transmit information, including, in some instances, control commands to operate apparatus to implement the processes described above. The storage device 830 can additionally store related data in a database 830A and database 830B, as needed.

Network Diagram

Figure 9:
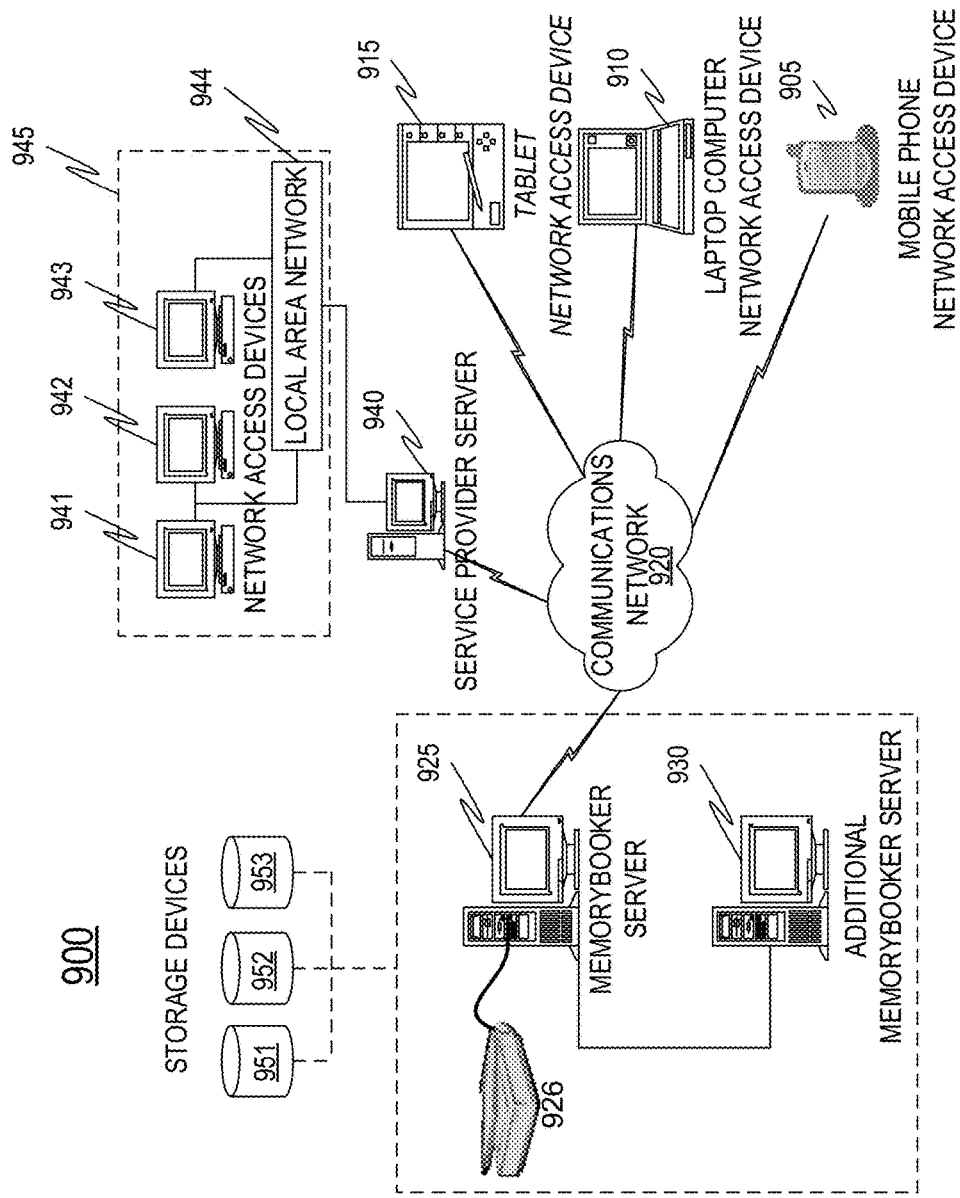
FIG. 9 illustrates a network diagram including a processing and interface system for generated an annotated, virtual MemoryBooker is illustrated.

Referring now to FIG. 9, a network diagram including a processing and interface system 900 for generating a MemoryBooker with static image data and Spatial Coordinates. The system 900 may comprise a MemoryBooker server 940; support servers 925, 930; MemoryBooker static image and user data storage devices 951, 952, 953; and network access devices 905-915.

An image capture device 926 may provide static image data emulating pages of a memory book volume to the MemoryBooker Server 925. The MemoryBooker Server 925 may associate Spatial Coordinates to areas of respective emulated pages of the memory book volume.

The network access devices 905-915 may allow a user to interface with the system 900. In some embodiments, the system 900 may be linked through a variety of networks. For example, a branch of the system, such as the MemoryBooker provider server 940, may have a separate communication system 945, wherein multiple network access devices 941-943 may communicate through a local area network (LAN) 944 connection. The local network access devices 941-943 may include a tablet, a personal computer, a computer, a mobile phone, a laptop, a mainframe, or other digital processing device The Virtual MemoryBooker server 940 may connect to a separate communications network 920, such as the Internet. Similarly, network access devices 905-915 may connect to the Virtual MemoryBooker server 940 through a communications network 920. The network access devices 905-915 may be operated by multiple parties. For example, a tablet network access device 915 may comprise a cellular tablet. A laptop computer network access device 910 may be a personal device owned by an individual User.

Accordingly, the servers 925, 930, 940 and network access devices 905-915 are separate entities for illustrative purposes only. For example, the Virtual MemoryBooker server 940 may be operated by the SDSP, and the MemoryBooker servers 925, 930 may be integrated into the Virtual MemoryBooker server communication system 945. The Virtual MemoryBooker may also provide a digital assistant network access device 915 to Users. Alternatively, the Virtual MemoryBooker may only provide the access device 915 to users. In some such aspects, the servers 925, 930, 940 may be operated by a third party or multiple third parties, such as, for example, the manufacturers of the Products carried by the vendor.

Figure 10:
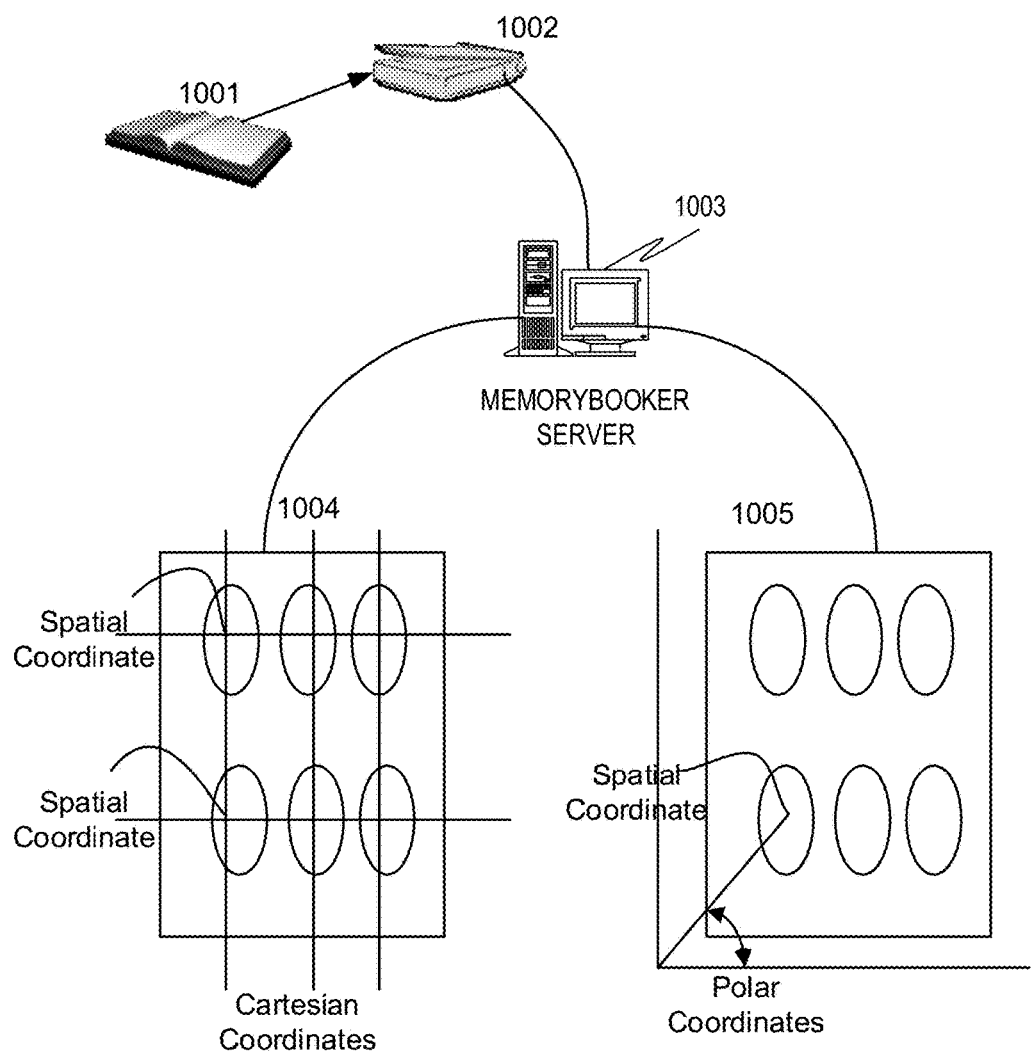
FIG. 10 illustrates a block diagram of an image capture apparatus and associated server.

Referring now to FIG. 10 a block diagram illustrating apparatus for generating a MemoryBooker is illustrated. A memory book volume 1001, or other media book is converted by a digital image generator 1002. The digital image generator 1002 may include, for example an image capture device that creates a static image of respective pages of the physical memory book. The digital image generator 1002 may operate, by way of non-limiting example based upon charge-coupled device (CCD) input received from the respective pages of the memory book or other physical volume. In some embodiments, static image data, such as a PDF image may be generated based upon electronic input.

A MemoryBooker Server 1003 may receive the static image data of respective pages of a memory book and correlate areas of the respective pages with Spatial Coordinates 1004-1005. Spatial Coordinates 1004-1005 may include, by way of non-limiting example, one or more of: Cartesian Coordinates, such as an X-Y designation' and a Polar Coordinate, such as a point on a plane determined by a distance from a fixed point and an angle from a fixed direction.

The MemoryBooker Server may then receive MemoryBooker Entries based upon a page and Spatial coordinate according to the apparatus and methods discussed herein.

Figure 11:
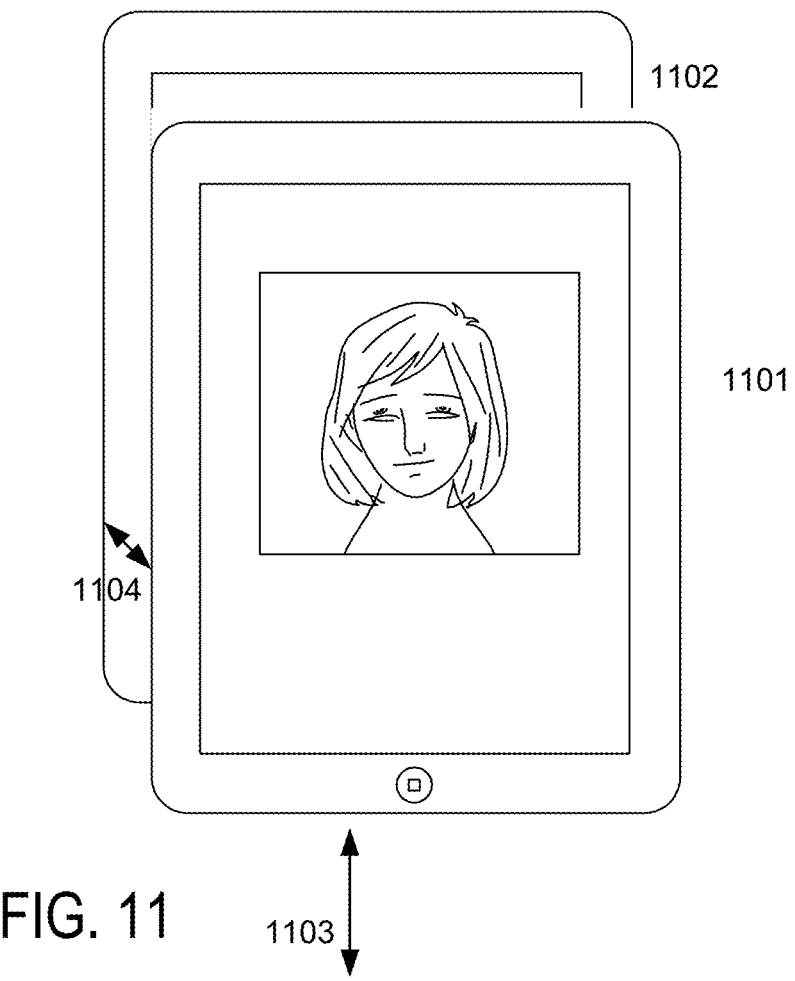
FIG. 11 illustrates apparatus for generating an image for media entry with enhanced depth.

Referring now to FIG. 11, in some embodiments, a MemoryBooker Entry may include an image of a user making the entry, wherein the image has enhanced depth. Enhanced depth may be generated by taking multiple image captures 1101 and 1102 with each image capture taken at a different distance 1103 and 1104 respectively. Post image capture processing may process the captured image data and generate a post-processed image with enhanced depth.

Additional variations may include a MemoryBooker Entry with a panorama of image data. The panorama of image data may be captured via multiple image capture events (digital pictures) taken in a general arc type pattern around a subject. Typically the subject will include a person making a MemoryBooker entry.

Figure 12:
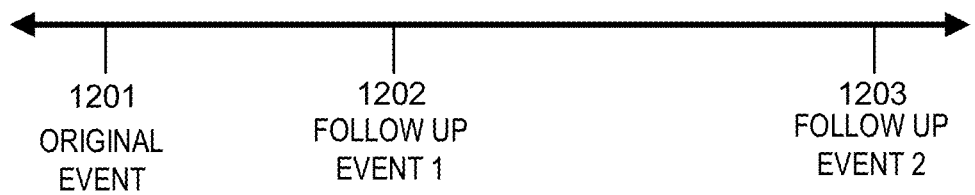
FIG. 12 illustrates a timeline including an original event and one or more follow up events.

Referring now to FIG. 12, in some embodiments, a MemoryBooker Entry associated with a Spatial Coordinate and page may be periodically appended to with additional media input. For example, a picture of a student taken during a high organization tenure may be accompanied by a picture of the same student at a follow up event. A follow up even may include, by way of example, a high organization reunion, or other event. Some embodiments may also include multiple events 1201-1203 with respective updated MemoryBooker Entries, which may include the original event 1201 and two follow-up events 1202, 1203.

Conclusion

A number of embodiments have been described. While this specification contains many specific implementation details, there should not be construed as limitations on the scope of any disclosures or of what may be claimed, but rather as descriptions of features specific to particular embodiments of In some embodiments,.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

The invention claimed is:

1. An image generating apparatus for providing an infrastructure for generating an interactive MemoryBooker volume based upon a static replication of a hardcopy Memory Book, the apparatus comprising:
    an image capture device for generating digital image data representative of disparate pages of a hardcopy memory book, wherein each disparate page memorializes a designated page of the hardcopy memory book as static image data;
    one or more computer servers for post processing the digital image data representative of one or more pages of the hardcopy memory book, said computer server in logical communication with the image capture device and accessible with a network access device via a digital communications network; and
    executable software stored on the one or more computer servers and executable on demand, the software operative with the one or more servers to cause the apparatus to:
        receive the static image data memorializing designated pages of the hardcopy memory book from the image capture device;
        assign the static image data with respective page numbers;
        associate Cartesian Coordinates with specific segregated spatial areas of the static image data received from the image capture device;
        designate an area to post media entries for respective Cartesian Coordinates;
        transmit over the digital communications network to a First user, a first Memorybooker interface comprising the static image data, the assigned page numbers and the Cartesian Coordinates associated with specified areas of the static image data;

receive via the digital communications network an identification of a First User;

receive via the digital communications network a designation of a First User selected page number and a First User selected Cartesian Coordinate from the First User Interface;

receive from the First User via the digital communications network a Memorybooker entry associated with the First User and the selected page number and selected Cartesian Coordinate, wherein said Memorybooker entry comprises a media entry and a designation of a recipient Second User;

generate a second Memorybooker interface comprising the static image data and the Memorybooker entry located in the area designated as the area to post media entries for the selected Cartesian Coordinates;

transmit to a Second User a Second User Interface, said Second User Interface comprising a notification that the Memorybooker entry has been received from the First User and an interactive control functional to transmit an indication of the Second User accepting or rejecting the Memorybooker entry, wherein the Second User comprises a recipient of the Memorybooker entry;

receive from the recipient of the Memorybooker entry via the digital communications network an indication accepting the Memorybooker entry; and transmit a Memorybooker volume comprising a Memorybooker volume comprising the static image of a selected page and the Memorybooker entry specifically entered for the Second User by the First User based the receipt of the indication accepting the Memorybooker entry.

2. The apparatus of claim 1 wherein the executable software stored on the one or more computer servers and executable on demand, is additionally operative with the one or more computer servers to cause the apparatus to transmit a notification to the Recipient User that the MemoryBooker entry has been received.

3. The apparatus of claim 2 wherein the executable software stored on the one or more computer servers and executable on demand, is additionally operative with the one or more computer servers to cause the apparatus to receive a response from the Recipient User to accept the Memory-Booker entry into a storage as part of the Recipient User's MemoryBooker.

4. The apparatus of claim 2 wherein the executable software stored on the one or more computer servers and executable on demand, is additionally operative with the one or more computer servers to cause the apparatus to receive a subsequent MemoryBooker entry from the Second User, wherein the subsequent MemoryBooker entry is correlated with the Spatial Coordinates.

5. The apparatus of claim 3 wherein the static image data comprises images of family members associated with a same extended family.

6. The apparatus of claim 3 wherein the static image data comprises images of employees of a same legal entity.

7. The apparatus of claim 3 wherein the static image data comprises images of team members of a same sports team.

8. The apparatus of claim 3 wherein the static image data comprises images of members of a same organization activity group.

9. The apparatus of claim 3 wherein the MemoryBooker Entry comprises a text message.

10. The apparatus of claim 3 wherein the MemoryBooker Entry comprises a digital image.

11. The apparatus of claim 3 wherein the MemoryBooker Entry comprises an emoticon.

12. The apparatus of claim 3 wherein the MemoryBooker Entry comprises a free-style drawing.

13. The apparatus of claim 3 wherein the MemoryBooker Entry comprises a audio clip.

14. The apparatus of claim 3 wherein the MemoryBooker Entry comprises a video clip.

15. The apparatus of claim 1 wherein the software is additionally operative to transmit an administrator interface to configure the MemoryBooker interface.

16. An apparatus for receiving a MemoryBooker volume, the apparatus comprising:

an image capture device for generating digital image data representative of disparate pages of a hardcopy memory book, wherein each disparate page memorializes a designated page of the hardcopy memory book as static image data;

one or more computer servers for post processing the digital image data representative of one or more pages of the hardcopy memory book, said computer server in logical communication with the image capture device and accessible with a network access device via a digital communications network; and executable software stored on the one or more computer servers and executable on demand, the software operative with the one or more servers to cause the apparatus to:

receive an interface comprising static image data generated via an image capture device, said static image data correlating with a page of a physical memorybook and a Memorybooker entry associated with a First User selected page number and First User selected Cartesian Coordinates designating a specified area of the static image data from the image capture device;

transmit over the digital communications network an instruction to accept the Memorybooker entry; and receive the Memorybooker volume comprising a Memorybooker Interface via the digital communications network to a Recipient User Network Access Device wherein the Memorybooker volume comprises the Memorybooker entry specifically entered for the Recipient User at a position based upon the First User selected Cartesian Coordinates.

17. The apparatus of claim 16 wherein the network access device comprises a mobile device communicating via a 4G cellular network.

18. A computerized apparatus for providing a Memory-Booker entry, the apparatus comprising:

a communications network access device for accessing a server in logical communication with a digital communications network; and executable software stored on the communications network access device and executable on demand, the software operative with the communications network access device to cause the network access device to:

receive via the communications network a Memory-Booker interface comprising static image data generated via an image capture device, said static image data correlating with a page of a physical memory book and Cartesian Coordinates mapping multiple specified areas of MemoryBooker interface;

track a value of a Cartesian Coordinate based upon a cursor position in the MemoryBooker interface, wherein the cursor position is controlled by a First User;

receive from the First User a designation of a Second User to which a MemoryBooker entry will be submitted;

receive a MemoryBooker entry from the First User to be submitted to the Second User;

associate with the MemorvBooker entry a page number the tracked value of Cartesian Coordinates based upon the cursor position;

transmit over the digital communications network the MemoryBooker entry, the page number, the tracked value of Cartesian Coordinates, and an identifier of the First User as a MemoryBooker signer; and transmit over the digital communications network an identifier of the Second User, wherein the Second User receives the MemoryBooker entry.

19. The computerized apparatus of claim 18 wherein the communications network access device comprises a mobile device communicating via a wireless cellular network.

\* \* \* \* \*